United States Patent
Hwang et al.

(10) Patent No.: US 11,720,826 B2
(45) Date of Patent: Aug. 8, 2023

(54) FEEDBACK LOOP LEARNING BETWEEN ARTIFICIAL INTELLIGENCE SYSTEMS

(71) Applicant: International Business Machines Corporation, Armonk, NY (US)

(72) Inventors: Jinho Hwang, Ossining, NY (US); Larisa Shwartz, Greenwich, CT (US); Hagen Völzer, Zurich (CH); Michael Elton Nidd, Zurich (CH); Rodrigo Otavio Castrillon, Campinas (BR)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 769 days.

(21) Appl. No.: 16/521,185

(22) Filed: Jul. 24, 2019

(65) Prior Publication Data
US 2021/0027136 A1 Jan. 28, 2021

(51) Int. Cl.
*G06N 5/02* (2023.01)
*G06N 20/20* (2019.01)
*G06N 3/082* (2023.01)
*G06F 9/54* (2006.01)
*G06F 18/2413* (2023.01)
*G06N 3/044* (2023.01)

(52) U.S. Cl.
CPC .......... *G06N 20/20* (2019.01); *G06F 9/541* (2013.01); *G06F 9/542* (2013.01); *G06F 18/2413* (2023.01); *G06N 3/044* (2023.01); *G06N 3/082* (2013.01)

(58) Field of Classification Search
CPC .................................................. G06K 9/627
See application file for complete search history.

(56) References Cited

U.S. PATENT DOCUMENTS

| 7,636,698 B2 * | 12/2009 | Crivat .................. G06F 16/283 706/21 |
| 8,806,644 B1 * | 8/2014 | McCorkendale ... H04L 63/1416 713/188 |
| 10,296,848 B1 * | 5/2019 | Mars ...................... G06N 20/20 |
| 10,783,801 B1 * | 9/2020 | Beaubien ............. A61B 5/0245 |

(Continued)

FOREIGN PATENT DOCUMENTS

WO 2005033934 2/2005

OTHER PUBLICATIONS

Pahl et al., "Machine Learning as a Reusable Microservice," NOMS 2018-2018 IEEE/IFIP Network Operations and Management Symposium, pp. 1-7, IEEE, (2018).

Miguel et al., "Marvin-Open Source Artificial Intelligence Platform," International Conference on Predictive Applications and APIs, pp. 33-44, (2018).

(Continued)

*Primary Examiner* — Jae U Jeon
(74) *Attorney, Agent, or Firm* — Amin, Turocy & Watson, LLP

(57) ABSTRACT

Techniques that facilitate feedback loop learning between artificial intelligence systems are provided. In one example, a system includes a monitoring component and a machine learning component. The monitoring component identifies a data pattern associated with data for an artificial intelligence system. The machine learning component compares the data pattern to historical data patterns for the artificial intelligence system to facilitate modification of at least a component of the artificial intelligence system and/or one or more dependent systems of the artificial intelligence system.

20 Claims, 13 Drawing Sheets

(56) References Cited

U.S. PATENT DOCUMENTS

| | | | |
|---|---|---|---|
| 11,151,468 B1* | 10/2021 | Chen | G06Q 30/0202 |
| 2007/0074149 A1 | 3/2007 | Ognev | |
| 2007/0094168 A1* | 4/2007 | Ayala | G06N 3/105 |
| | | | 706/15 |
| 2009/0210368 A1 | 8/2009 | Deo | |
| 2010/0063948 A1* | 3/2010 | Virkar | G06N 20/10 |
| | | | 707/769 |
| 2018/0068271 A1 | 3/2018 | Abebe et al. | |
| 2018/0089591 A1* | 3/2018 | Zeiler | G06F 3/048 |
| 2019/0019095 A1* | 1/2019 | Mietke | G06F 11/3466 |
| 2019/0042290 A1 | 2/2019 | Bailey et al. | |
| 2019/0114417 A1* | 4/2019 | Subbarayan | H04L 41/145 |
| 2019/0318245 A1* | 10/2019 | Song | G06N 3/082 |
| 2019/0356555 A1* | 11/2019 | Bai | H04L 41/5009 |
| 2020/0160170 A1* | 5/2020 | Kursun | G06N 3/045 |
| 2020/0160227 A1* | 5/2020 | Liu | G06N 20/00 |
| 2020/0366574 A1* | 11/2020 | Schubert | H04L 41/5032 |
| 2020/0380381 A1* | 12/2020 | Aaron | G06N 20/00 |

OTHER PUBLICATIONS

Bahadori et al., "DevOps Meets Dynamic Orchestration," International Workshop on Software Engineering Aspects of Continuous Development and New Paradigms of Software Production and Deployment, pp. 142-154, Springer, Cham, (2018).

Hummer et al., "ModelOps: Cloud-based Lifecycle Management for Reliable and Trusted AI," (2019).

https://sudo.hailoapp.com/services/2015/03/09/journey-into-a-microservice-world-part-3/.

twitter.com, "Twitter microservices map looks just like the Netflix one. We called this the "Death Star" diagram," https://twitter.com/adrianco/status/441883572618948608, Retrieved: May 14, 2019, 1 page.

slideshare.net, "The Case for Chaos," https://www.slideshare.net/BRUCEWONG3/THE-CASE-FOR-CHAOS, Retrieved: May 14, 2019, 28 pages.

Mell et al., "The NIST Definition of Cloud Computing," Recommendations of the National Institute of Standards and Technology, NIST Special Publication 800-145, Sep. 2011, 7 pages.

* cited by examiner

FEEDBACK LOOP LEARNING BETWEEN ARTIFICIAL INTELLIGENCE SYSTEMS

BACKGROUND

The subject disclosure relates to data analytics systems, and more specifically, to learning associated with artificial intelligence for data analytics systems.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products that facilitate feedback loop learning between artificial intelligence systems are described.

According to an embodiment, a system can comprise a monitoring component and a machine learning component. The monitoring component can identify a data pattern associated with data for an artificial intelligence system. The machine learning component can compare the data pattern to historical data patterns for the artificial intelligence system to facilitate modification of a component of the artificial intelligence system. In certain embodiments, the machine learning component can compare the data pattern to historical data patterns for the artificial intelligence system to facilitate modification of at least a component of the artificial intelligence system and/or a dependent system associated with the artificial intelligence system.

According to another embodiment, a computer-implemented method is provided. The computer-implemented method can comprise monitoring, by a system operatively coupled to a processor, an artificial intelligence system to identify a data pattern associated with data for the artificial intelligence system. The computer-implemented method can also comprise comparing, by the system, the data pattern to historical data patterns for the artificial intelligence system.

According to yet another embodiment, a computer program product for facilitating feedback loop learning between artificial intelligence systems can comprise a computer readable storage medium having program instructions embodied therewith. The program instructions can be executable by a processor and cause the processor to monitor, by the processor, an artificial intelligence system to identify a data pattern associated with data for the artificial intelligence system. The program instructions can also cause the processor to compare, by the processor, the data pattern to historical data patterns for the artificial intelligence system. Furthermore, the program instructions can also cause the processor to modify, by the processor, one or more portions of the artificial intelligence system based on the data pattern and the historical data patterns.

DETAILED DESCRIPTION

Figure 1:
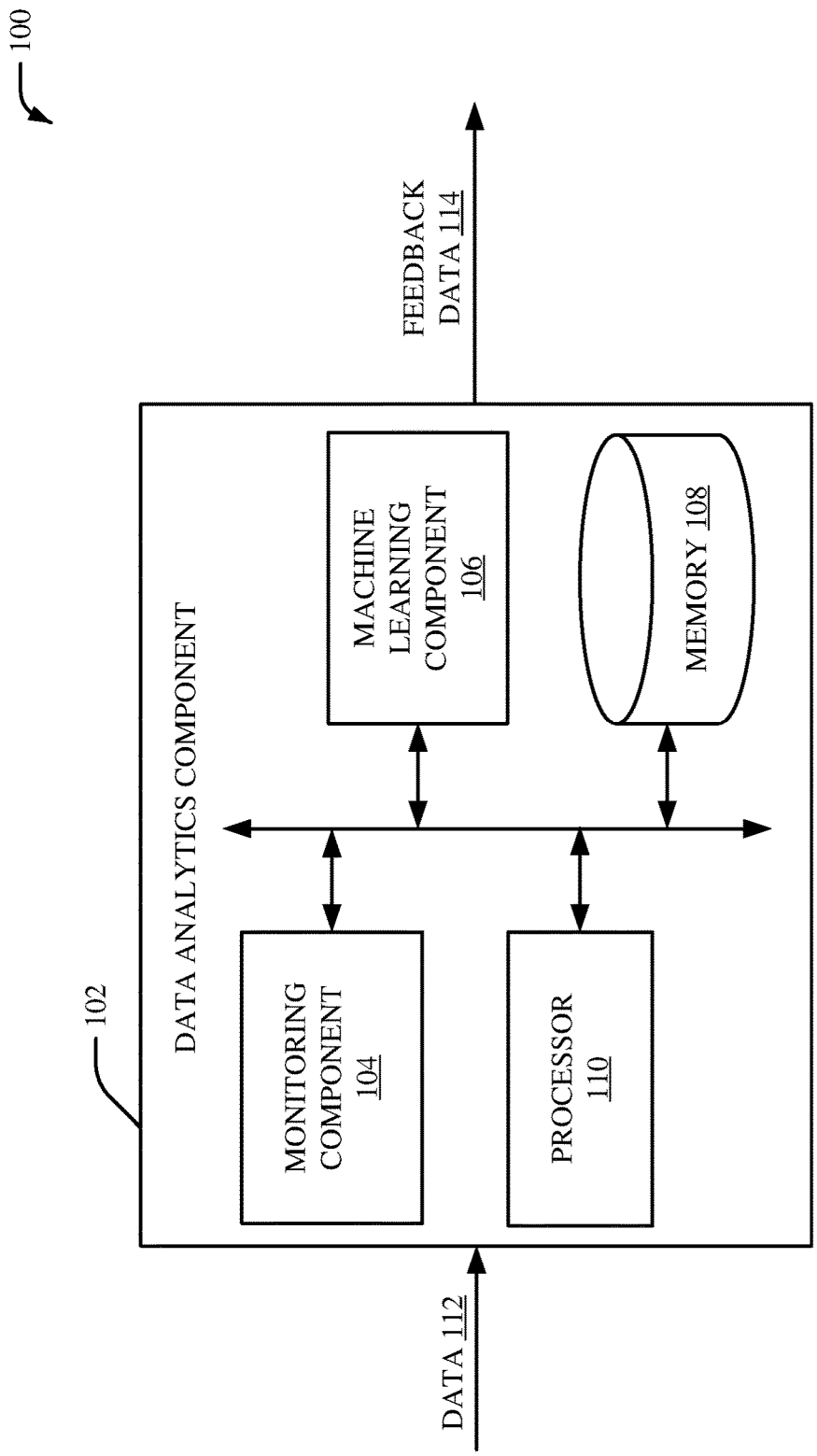
FIG. 1 illustrates a block diagram of an example, non-limiting system that includes a data analytics component in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

In this regard, artificial intelligence (AI) service systems often have a separation between offline learning/training and online prediction. Due to the separation between offline learning/training and online prediction in an AI service system, online machine learning and/or incremental learning is generally difficult. For instance, an AI service system is generally updated based on generated models and/or new use cases. However, due to the separation between offline learning/training and online prediction, it is generally difficult to cohesively update offline learning/training and online prediction. In an example, a development system for an AI service system and an operation system for an AI service system are generally separated and execute AI processes with minimal communication. The development system generally is not informed when new data should be ingested to train a new model. Furthermore, timing for offline learning/training is often determined when there are new use cases generated by the operations system. A new use case in an AI service systems generally requires a new implementation to facilitate execution in by the operations system. In certain implementations, the operations system can directly monitor a model. For example, the operations system can monitor how an accuracy rate changes over time for the model. However, the operations system generally is not able to adequately update the model based on data generated by the development system develop due to lack of process and/or communication between the operations system and the development system. As such, learning and/or training by an AI system (e.g., an AI service system) can be improved.

Embodiments described herein include systems, computer-implemented methods, and computer program products that provide feedback loop learning between artificial intelligence systems. For example, feedback loop learning between a development system for an artificial intelligence system and an operations system for the artificial intelligence systems can be provided. In an embodiment, data associated with an artificial intelligence system can be collected and/or analyzed. In an example, one or more events associated with the artificial intelligence system, one or more communications (e.g., one or more application programming interface (API) communications) associated with the artificial intelligence system, one or more execution results associated with the artificial intelligence system, and/or other data associated with the artificial intelligence system can be collected and/or analyzed. Based on the data associated with the artificial intelligence system, deviation from an existing model of the artificial intelligence system can be inferred. For example, deviation from one or more patterns (e.g., one or more communication patterns) for an existing model of the artificial intelligence system can be inferred based on the data associated with the artificial intelligence system. Furthermore, the one or more patterns can be provided to a development system of the artificial intelligence system via a communication channel. For instance, a feedback loop associated with communication channel for a distributed version control system can provide the one or more patterns to the development system of the artificial intelligence system. Additionally, online machine learning can be employed to determine whether or not there are new potential classes (e.g. new use cases) for the artificial intelligence system. The data associated with the new potential classes (e.g., the new use cases) can additionally or alternatively be provided to the development system of the artificial intelligence system via the communication channel. In an embodiment, active learning can be employed to enable determining need for component changes in the artificial intelligence system based on data patterns associated with operations of the artificial intelligence system. Data associated with the artificial intelligence system and/or the operations of the artificial intelligence system can be obtained in approximately real-time. In certain embodiments, user feedback data can additionally or alternatively be employed via a learning engine of the artificial intelligence system. As such, an operation of the artificial intelligence system can obtain knowledge regarding for updating and/or developing a new feature for the artificial intelligence system. Furthermore, an inline microservice of the artificial intelligence system can be provided that monitors an environment of the artificial intelligence system. A learning model can also be provided to identify and/or learn when to update and/or develop a new feature for the artificial intelligence system. The new feature can also be provided to the development system of the artificial intelligence system via a feedback loop of the artificial intelligence system. Additionally or alternatively, additional new information associated with the artificial intelligence system can be provided to the development system of the artificial intelligence system via the feedback loop of the artificial intelligence system.

As such, a technique to detect a need for artificial intelligence component changes can be provided. Communication driven monitoring capability for artificial intelligence systems can also be provided to detect and/or infer communication pattern changes in the artificial intelligence system. Additionally, an ability to detect and/or infer data pattern changes via communication traffics can be provided. Relational service component changes can also be detected to facilitate feedback of dependency and/or conformation of communications between the artificial intelligence system and one or more dependent systems of the artificial intelligence system, where dependent systems should be updated together with a new model and/or a new use case. New classes (e.g., untrained classes) can also be dynamically inferred based on observed data for the artificial intelligence system that is collected over time. In addition, an indication for a need to update artificial intelligence components can be provided to a development system to update and/or train respective artificial intelligence components for the changes. Accordingly, performance and/or accuracy of an artificial intelligence system can be improved. Changes to different portions of an artificial intelligence system can also be provided with conformity. Moreover, accuracy of data generated by a machine learning process can be improved, quality of data generated by a machine learning process can be improved, speed of data generated by a machine learning process can be improved, and/or a cost for analyzing data using a machine learning process can be reduced. Accuracy and/or quality of a machine learning model and/or training data associated with an artificial intelligence system can also be provided.

FIG. 1 illustrates a block diagram of an example, non-limiting system 100 that facilitates feedback loop learning between artificial intelligence systems in accordance with one or more embodiments described herein. In various embodiments, the system 100 can be a system associated with technologies such as, but not limited to, artificial intelligence technologies, machine learning technologies, data analytics technologies, cognitive computing technologies, cloud computing technologies, computer technologies, server technologies, server/client technologies, internet technology (IT) technologies, information technologies, digital technologies, data processing technologies, and/or other computer technologies. The system 100 can employ hardware and/or software to solve problems that are highly technical in nature, that are not abstract and that cannot be performed as a set of mental acts by a human. Further, some of the processes performed may be performed by one or more specialized computers (e.g., one or more specialized processing units, a specialized computer with a data analytics component, etc.) for carrying out defined tasks related to machine learning and/or data analytics. The system 100 and/or components of the system can be employed to solve new problems that arise through advancements in technologies mentioned above, and/or computer architecture, and the like. One or more embodiments of the system 100 can provide technical improvements to artificial intelligence systems, machine learning systems, data analytics systems, cognitive computing systems, cloud computing systems, computer systems, server systems, server/client systems, IT systems, information systems, digital systems, data processing systems, and/or other systems. One or more embodiments of the system 100 can also provide technical improvements to a processing unit (e.g., a processor) associated with a data analytics process by improving processing performance of the processing unit, improving processing efficiency of the processing unit, and/or reducing an amount of time for the processing unit to perform a data analytics process. One or more embodiments of the system 100 can also provide technical improvements to a server/client computing environment (e.g., a server/client computing platform) by improving processing performance of the server/client computing environment and/or improving processing efficiency of the server/client computing environment. In one example, the system 100 can be associated with a machine learning process and/or a data analytics process.

In the embodiment shown in FIG. 1, the system 100 can include a data analytics component 102. As shown in FIG. 1, the data analytics component 102 can include a monitoring component 104 and a machine learning component 106. Aspects of the data analytics component 102 can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. In an aspect, the data analytics component 102 can also include memory 108 that stores computer executable components and instructions. Furthermore, the data analytics component 102 can include a processor 110 to facilitate execution of the instructions (e.g., computer executable components and corresponding instructions) by the data analytics component 102. As shown, the monitoring component 104, the machine learning component 106, the memory 108 and/or the processor 110 can be electrically and/or communicatively coupled to one another in one or more embodiments.

The data analytics component 102 (e.g., the monitoring component 104 of the data analytics component 102) can receive data 112. For example, the data analytics component 102 (e.g., the monitoring component 104 of the data analytics component 102) can receive the data 112 in response to monitoring by the monitoring component 104. The monitoring component 104 can, for example, monitor one or more portions of an artificial intelligence system. As such, the data 112 can be related to the artificial intelligence system. The data 112 can include, for example, data related to one or more events associated with the artificial intelligence system, data related to one or more communications (e.g., one or more API communications) associated with the artificial intelligence system, data related to one or more execution results associated with the artificial intelligence system, and/or other data associated with the artificial intelligence system. The artificial intelligence system can employ one or more artificial intelligence techniques and/or one or more machine learning techniques in a distributed computing environment. For instance, a first portion of the artificial intelligence system can be associated with learning/training (e.g., offline learning/training) and a second portion of the artificial intelligence system can be associated with prediction (e.g., online prediction). In an embodiment, the artificial intelligence system can be an artificial intelligence service system. For instance, the artificial intelligence system can manage a set of artificial intelligence components for a microservice. An artificial intelligence component can be, for example, a system that provides supervised learning to map input to output via an artificial intelligence model. In certain embodiments, the artificial intelligence system can include a development system (e.g., a first artificial intelligence system) and an operations system (e.g., a second artificial intelligence system) to facilitate one or more development processes and/or one or more operations processes associated with machine learning. In certain embodiments, the data 112 can be generated by one or more electronic devices. Additionally or alternatively, the data 112 can be stored in one or more databases that receives and/or stores the data 112 associated with the one or more electronic devices. The one or more electronic devices can include, for example, one or more computing devices, one or more computers, one or more desktop computers, one or more laptop computers, one or more monitor devices, one or more smart devices, one or more smart phones, one or more mobile devices, one or more handheld devices, one or more tablets, one or more wearable devices, one or more portable computing devices, one or more medical devices, one or more sensor devices, one or more controller devices, and/or or one or more other computing devices. In an aspect, the data 112 can be digital data. Furthermore, the data 112 can include one or more types of data, such as but not limited to, electronic device data, sensor data, network data, metadata, user data, geolocation data, wearable device data, health-related data, medical imaging data, audio data, image data, video data, textual data and/or other data. In an embodiment, the data 112 can be raw data. In another embodiment, at least a portion of the data 112 can be encoded data and/or processed data.

In an embodiment, the monitoring component 104 can identify a data pattern associated with the data 112. For example, the monitoring component 104 can monitor the data 112 to identity one or more data patterns in the data 112. In certain embodiments, the monitoring component 104 can monitor one or more communication channels associated with the artificial intelligence system. For example, the monitoring component 104 can monitor one or more communications (e.g., one or more API communications) associated with the artificial intelligence system. In certain embodiments, the monitoring component 104 can monitor API requests, API responses and/or logs associated with the artificial intelligence system. In another example, the monitoring component 104 can monitor input data provided to one or more artificial intelligence components of the artificial intelligence system. Additionally or alternatively, the monitoring component 104 can monitor output data provided by one or more artificial intelligence components of the artificial intelligence system. In certain embodiments, the monitoring component 104 can monitor one or more events associated with the artificial intelligence system. For example, the monitoring component 104 can monitor one or more events associated with one or more artificial intelligence components of the artificial intelligence system. Additionally or alternatively, the monitoring component 104 can monitor one or more events associated with a server, middleware, an application and/or another component of the artificial intelligence system. In another example, the monitoring component 104 can monitor one or more events associated with different artificial intelligence subsystems of the artificial intelligence system. In yet another example, the monitoring component 104 can monitor one or more events associated with an operations system associated with the artificial intelligence system and/or a development system associated with the artificial intelligence system. In certain embodiments, the monitoring component 104 can monitor accuracy of output data generated by one or more components of the artificial intelligence system. For example, the monitoring component 104 can monitor accuracy of output data generated by one or more artificial intelligence components of the artificial intelligence system. In certain embodiments, the monitoring component 104 can employ one or more correctness inference techniques to augment data monitored by the monitoring component 104. For example the monitoring component 104 can employ similarity metrics for input data provided to an artificial intelligence component to infer whether output data provided by the artificial intelligence component is acceptable or not acceptable. In certain embodiments, the monitoring component 104 can employ one or more similarity measure techniques such as Euclidean distance, Manhattan distance, Cosine similarity and/or another technique to facilitate monitoring of the data 112. In certain embodiments, the monitoring component 104 can employ temporal information and/or spatial information associated with the data 112 to facilitate monitoring of the data 112. In certain embodiments, the monitoring component 104 can employ unsupervised learning to learn over time how the data 112 changes over time and/or to group the data 112 into a set of clusters to facilitate identifying data patterns in the data 112. In an aspect, the monitoring component 104 can compare one or more portions of the data 112 to a set of previously defined data patterns. For instance, the monitoring component 104 can compare one or more portions of the data 112 to a set of previously defined data patterns stored in the memory 108 or another data store associated with the data analytics component 102. A data pattern can be, for example, a digital data pattern associated with a classification. For example, a data pattern can be a defined arrangement of one or more characteristics of data. In certain embodiments, the monitoring component 104 can identify a data pattern associated with the data 112 based on a dependency mapping graph for the artificial intelligence system. The dependency mapping graph can be, for example, a graph that represents dependencies of two or more components (e.g., two or more artificial intelligence components). For example, the dependency mapping graph can provide a mapping of components (e.g., artificial intelligence components) represented by vertices connected by edges associated with relationship among the components (e.g., artificial intelligence components). Additionally or alternatively, the dependency mapping graph can be, for example, a graph that represents dependencies of two or more data elements. For example, the dependency mapping graph can provide a mapping of data elements represented by vertices connected by edges associated with relationship among the data elements.

The machine learning component 106 can compare, using one or more machine learning techniques, the data pattern to historical data patterns for the artificial intelligence system. For example, the machine learning component 106 can determine a classification for the data pattern based on the historical data patterns for the artificial intelligence system. In an embodiment, the machine learning component 106 can infer a new classification for one or more components of the artificial intelligence system. For instance, the machine learning component 106 can dynamically infer one or more new classes for one or more components of the artificial intelligence system based on, for example, observed data for the artificial intelligence system collected over a period of time. In an aspect, the machine learning component 106 can compare the data pattern to the historical data patterns to facilitate modification of one or more components of the artificial intelligence system. In an example, the machine learning component 106 can compare the data pattern to the historical data patterns to facilitate updating one or more portions of a model associated with the artificial intelligence system. In an example, the machine learning component 106 can compare the data pattern to the historical data patterns to facilitate updating one or more portions of source code associated with the artificial intelligence system. The machine learning component 106 can employ machine learning and/or principles of artificial intelligence (e.g., one or more machine learning processes) to compare the data pattern to the historical data patterns. The machine learning component 106 can perform learning explicitly or implicitly with respect to learning one or more patterns, one or more inferences, one or more correlations, one or more features and/or information related to the data 112 and/or a data pattern associated with the data 112. In an aspect, the machine learning component 106 can learn one or more patterns, one or more inferences, one or more correlations, one or more features and/or information related to the data 112 and/or a data pattern associated with the data 112 based on classifications, correlations, inferences and/or expressions associated with principles of artificial intelligence. For instance, the machine learning component 106 can employ an automatic classification system and/or an automatic classification process to learn one or more patterns, one or more inferences, one or more correlations, one or more features and/or information related to the data 112 and/or a data pattern associated with the data 112. In one example, the machine learning component 106 can employ a probabilistic and/or statistical-based analysis (e.g., factoring into the analysis utilities and costs) to learn and/or generate inferences with respect to the data 112 and/or a data pattern associated with the data 112. In an aspect, the machine learning component 106 can include an inference component (not shown) that can further enhance automated aspects of the machine learning component 106 utilizing in part inference-based schemes to learn one or more patterns, one or more inferences, one or more correlations, one or more features and/or information related to the data 112 and/or a data pattern associated with the data 112.

The machine learning component 106 can employ any suitable machine-learning based techniques, statistical-based techniques and/or probabilistic-based techniques. For example, the machine learning component 106 can employ deep learning, expert systems, fuzzy logic, SVMs, Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, etc. In another aspect, the machine learning component 106 can perform a set of machine learning computations associated with learning one or more patterns, one or more inferences, one or more correlations, one or more features and/or information related to the data 112 and/or a data pattern associated with the data 112. For example, the machine learning component 106 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations to learn one or more patterns, one or more inferences, one or more correlations, one or more features and/or information related to the data 112 and/or a data pattern associated with the data 112. In an embodiment, the machine learning component 106 can generate feedback data 114. The feedback data 114 can be data to be provided to one or more components of the artificial intelligence system. Furthermore, the feedback data 114 can include, for example, a classification for the data pattern associated with the data 112. Additionally or alternatively, the feedback data 114 can include data associated with one or more system updates for the artificial intelligence system. For example, the feedback data 114 can include data to modify one or more components of the artificial intelligence system.

It is to be appreciated that the data analytics component 102 (e.g., the monitoring component 104 and/or the machine learning component 106) performs a machine learning process and/or a data analytics process that cannot be performed by a human (e.g., is greater than the capability of a single human mind). For example, an amount of data processed, a speed of processing of data and/or data types processed by the data analytics component 102 (e.g., the monitoring component 104 and/or the machine learning component 106) over a certain period of time can be greater, faster and different than an amount, speed and data type that can be processed by a single human mind over the same period of time. The data analytics component 102 (e.g., the monitoring component 104 and/or the machine learning component 106) can also be fully operational towards performing one or more other functions (e.g., fully powered on, fully executed, etc.) while also performing the above-referenced machine learning process and/or data analytics process. Moreover, the data analytics component 102 (e.g., the monitoring component 104 and/or the machine learning component 106) can include information that is impossible to obtain manually by a user. For example, a type of information included in the feedback data 114, an amount of information included in the feedback data 114 and/or a variety of information included in the feedback data 114 can be more complex than information obtained manually by a user.

Figure 2:
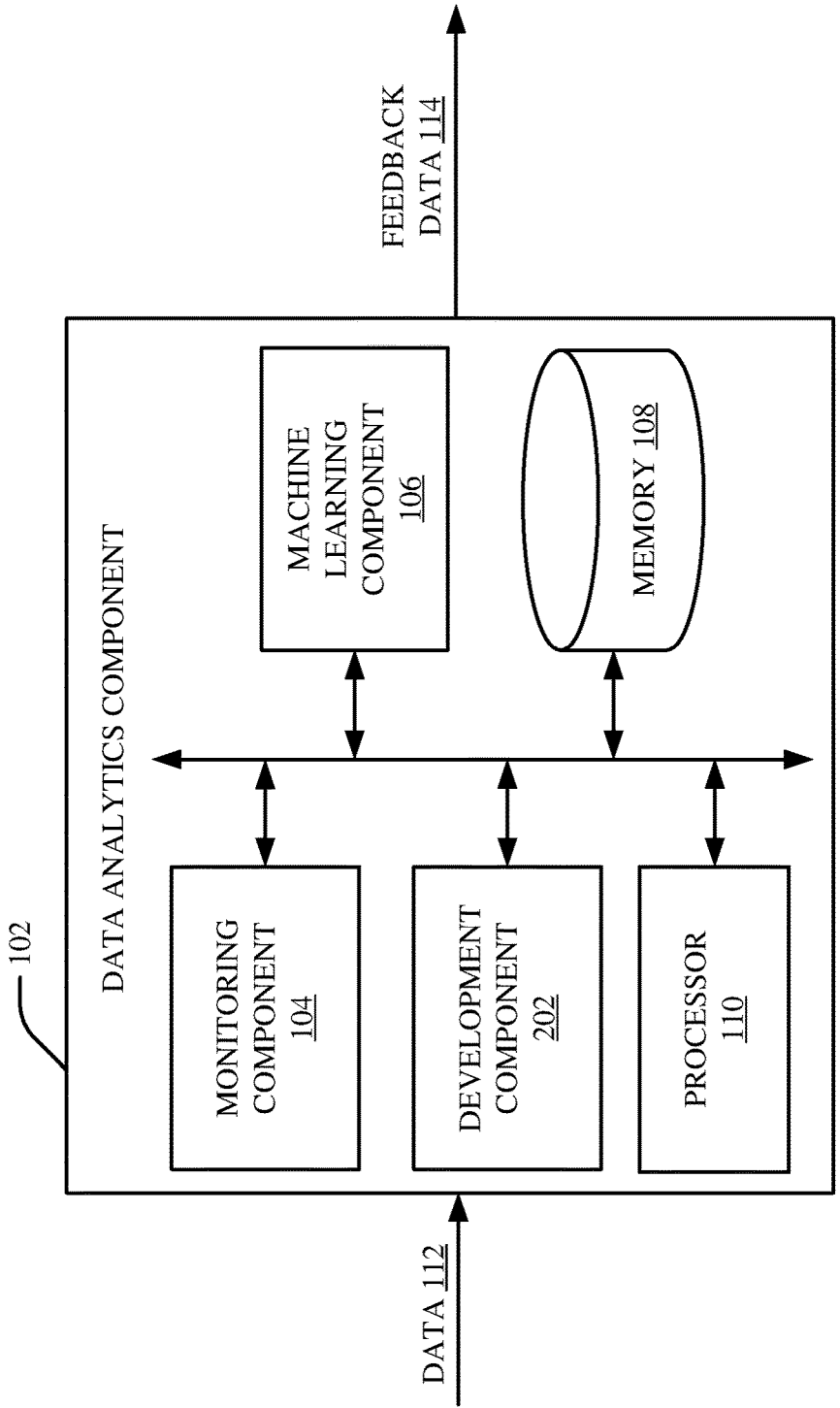
FIG. 2 illustrates a block diagram of another example, non-limiting system that includes a data analytics component in accordance with one or more embodiments described herein.

FIG. 2 illustrates a block diagram of an example, non-limiting system 200 in accordance with one or more embodiments described herein. Repetitive description of like elements employed in other embodiments described herein is omitted for sake of brevity.

The system 200 includes the data analytics component 102. The data analytics component 102 can include the monitoring component 104, the machine learning component 106, a development component 202, the memory 108 and/or the processor 110. The development component 202 can train one or more components of the artificial intelligence system based on one or more data patterns associated with the data 112. For example, the development component 202 can train one or more artificial intelligence components of the artificial intelligence system based on one or more data patterns associated with the data 112. In an aspect, the development component 202 can train one or more artificial intelligence components of the artificial intelligence system based on the feedback data 114. In certain embodiments, the development component 202 can train one or more models (e.g., one or more artificial intelligence models, one or more machine learning models, etc.) of the artificial intelligence system based on one or more data patterns associated with the data 112. For example, the development component 202 can modify and/or update training data for one or more models (e.g., one or more artificial intelligence models, one or more machine learning models, etc.) of the artificial intelligence system based on one or more data patterns associated with the data 112. In certain embodiments, the development component 202 can modify one or more models (e.g., one or more artificial intelligence models, one or more machine learning models, etc.) of the artificial intelligence system based on one or more data patterns associated with the data 112. For example, the development component 202 can modify one or more weights, one or more layers and/or one or more variables for one or more models (e.g., one or more artificial intelligence models, one or more machine learning models, etc.) of the artificial intelligence system based on one or more data patterns associated with the data 112. In certain embodiments, the development component 202 can modify a machine learning network (e.g., a neural network, etc.) of the artificial intelligence system based on one or more data patterns associated with the data 112. In certain embodiments, the development component 202 can update an artificial intelligence component of the artificial intelligence system based on modification of another artificial intelligence component of the artificial intelligence system. For example, the development component 202 can modify a first artificial intelligence component of the artificial intelligence system (e.g., update training data for the first artificial intelligence component, update a model for the first artificial intelligence component, etc.) based on one or more data patterns associated with the data 112. Furthermore, the development component 202 can also modify at least a second artificial intelligence component of the artificial intelligence system (e.g., also update training data for at least the second artificial intelligence component, also update a model for at least the second artificial intelligence component, etc.) based on modification of the first artificial intelligence model.

Figure 3:
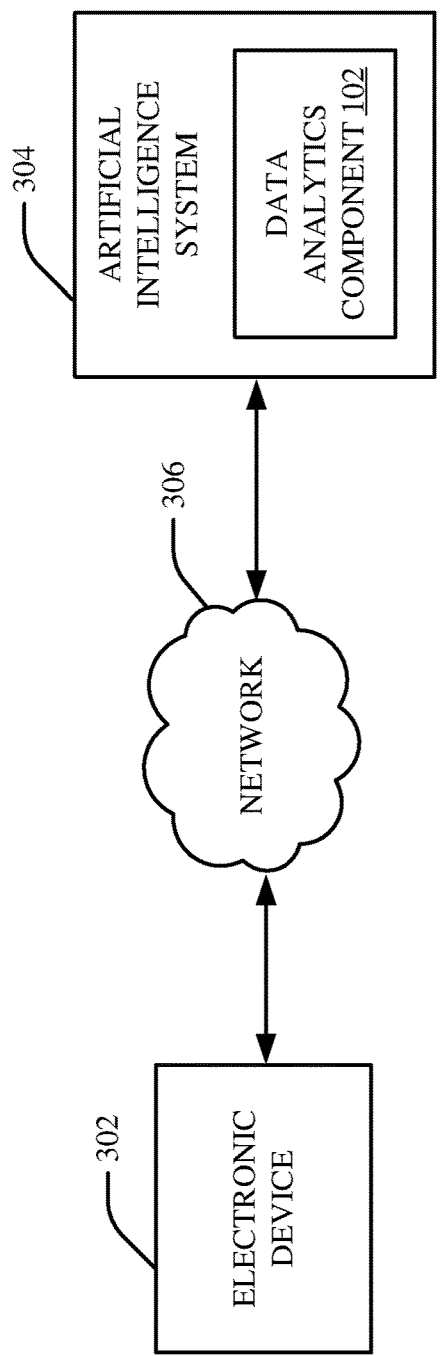
FIG. 3 illustrates an example, non-limiting system that includes an electronic device and an artificial intelligence system in accordance with one or more embodiments described herein.

FIG. 3 illustrates a block diagram of an example, non-limiting system 300 in accordance with one or more embodiments described herein. Repetitive description of like elements employed in other embodiments described herein is omitted for sake of brevity.

The system 300 includes an electronic device 302 and an artificial intelligence system 304. The artificial intelligence system 304 can include the data analytics component 102. In an embodiment, the data analytics component 102 can include the monitoring component 104, the machine learning component 106, the development component 202, the memory 108 and/or the processor 110. In certain embodiments, the artificial intelligence system 304 can be a server system. The artificial intelligence system 304 can be communicatively coupled to the electronic device 302 via a network 306. The network 306 can be a communication network, a wireless network, a wired network, an internet protocol (IP) network, a voice over IP network, an internet telephony network, a mobile telecommunications network or another type of network. In an embodiment, the system 300 can be a network environment (e.g., a computing network). For instance, the system 300 can be a cloud computing environment. The electronic device 302 can be configured to interact with a user (e.g., a user identity). The electronic device 302 can be, for example, a user device, a display device, a desktop computer, a laptop computer, a smart device, a smart phone, a mobile device, a handheld device, a tablet device, a virtual reality device, a portable computing device, or another electronic device associated with a display. In certain embodiments, the electronic device 302 can transmit data (e.g., at least a portion of the data 112) to the artificial intelligence system 304 via the network 306. For example, in certain embodiments, the electronic device 302 can transmit data (e.g., at least a portion of the data 112) to the data analytics component 102 via the network 306. In certain embodiments, the electronic device 302 can be communicatively coupled to an application programming interface of the artificial intelligence system 304. For example, in certain embodiments, the electronic device 302 can transmit data (e.g., at least a portion of the data 112) to the artificial intelligence system 304 via application programming interface of the artificial intelligence system 304.

Figure 4:
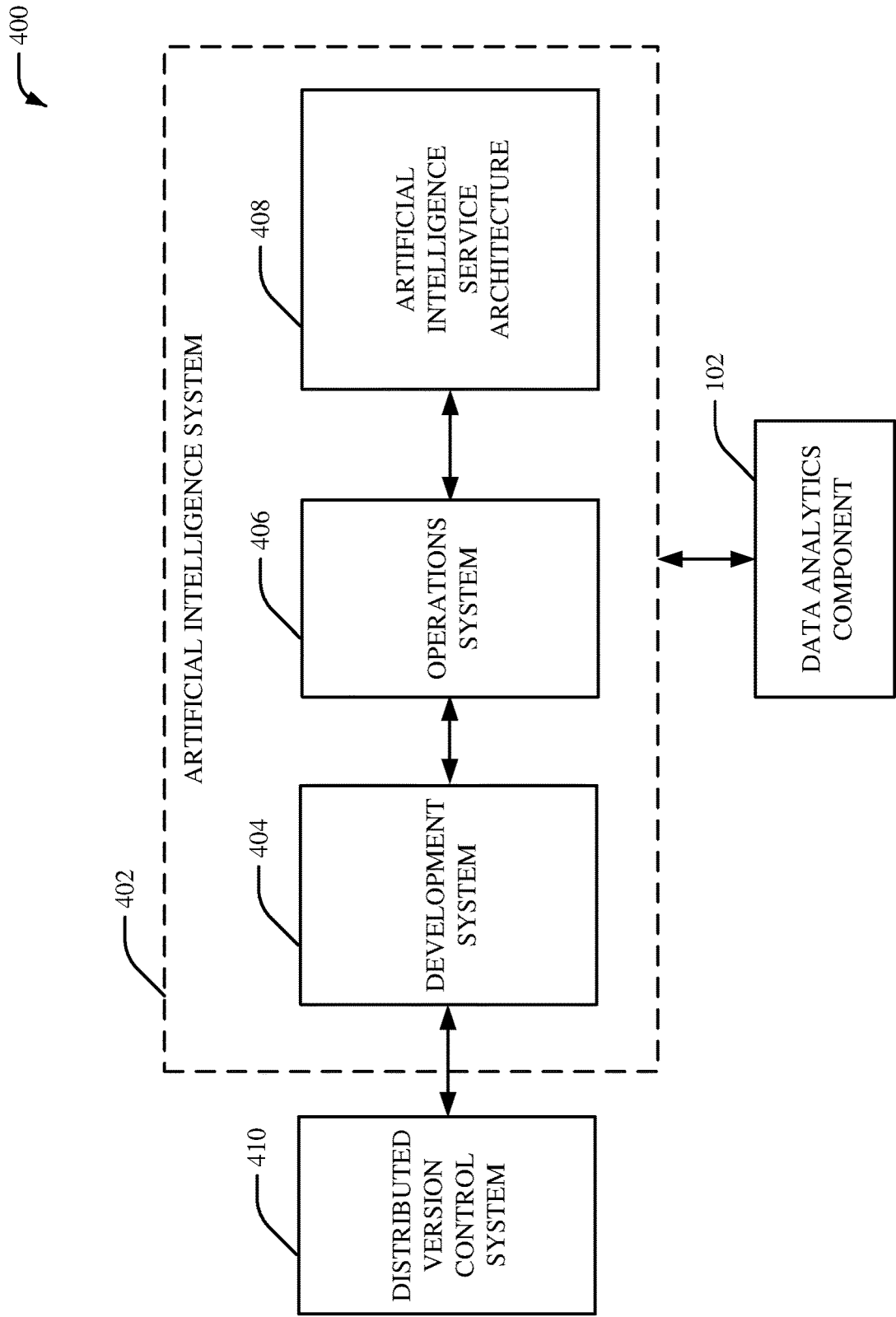
FIG. 4 illustrates an example, non-limiting system associated with feedback loop learning between artificial intelligence systems in accordance with one or more embodiments described herein.

FIG. 4 illustrates a block diagram of an example, non-limiting system 400 in accordance with one or more embodiments described herein. Repetitive description of like elements employed in other embodiments described herein is omitted for sake of brevity.

The system 400 includes an artificial intelligence system 402 and the data analytics component 102. In an embodiment, the data analytics component 102 can include the monitoring component 104, the machine learning component 106, the development component 202, the memory 108 and/or the processor 110. The artificial intelligence system 402 can include a development system 404, an operations system 406 and/or an artificial intelligence service architecture 408. The development system 404 can perform a planning process to determine a goal for the artificial intelligence service architecture 408, a code process to develop content for the artificial intelligence service architecture 408, a build process to compile content for the artificial intelligence service architecture 408, and/or a test process to test deployment of content for the artificial intelligence service architecture 408. For example, the development system 404 can perform planning process to determine a goal for one or more artificial intelligence components of the artificial intelligence service architecture 408, a code process to develop content for one or more artificial intelligence components of the artificial intelligence service architecture 408, a build process to compile content for one or more artificial intelligence components of the artificial intelligence service architecture 408, and/or a test process to test deployment of content for one or more artificial intelligence components of the artificial intelligence service architecture 408. The operations system 406 can perform a release process to plan a release of content into the artificial intelligence service architecture 408, a deploy process to integrate the content into the artificial intelligence service architecture 408, an operate process to execute one or more processes for the artificial intelligence service architecture 408 based on the content, and/or a monitoring process to monitor integration of the content into the artificial intelligence service architecture 408. For example, the operations system 406 can perform a release process to plan a release of content into one or more artificial intelligence components of the artificial intelligence service architecture 408, a deploy process to integrate the content into one or more artificial intelligence components of the artificial intelligence service architecture 408, an operate process to execute one or more processes for one or more artificial intelligence components of the artificial intelligence service architecture 408 based on the content, and/or a monitoring process to monitor integration of the content into one or more artificial intelligence components of the artificial intelligence service architecture 408. In an embodiment, the artificial intelligence service architecture 408 can be a microservice architecture that includes one or more artificial intelligence components, one or more automation components and/or one or more databases to facilitate providing a service to one or more electronic devices. In an non-limiting example, the artificial intelligence service architecture 408 can include approximately 450 or more artificial intelligence components that communicate together to provide learning and/or generating inferences with respect to content. However, it is to be appreciated that, in certain embodiments, the artificial intelligence service architecture 408 can include a different number of artificial intelligence components (e.g., more than 450 artificial intelligence components, less than 450 artificial intelligence components, etc.).

In an embodiment, the data analytics component 102 can be communicatively coupled to the artificial intelligence system 402. For example, the data analytics component 102 can be communicatively coupled to the development system 404, the operations system 406 and/or the artificial intelligence service architecture 408. In an aspect, the data analytics component 102 (e.g., the monitoring component 104 of the data analytics component 102) can monitor the development system 404, the operations system 406 and/or the artificial intelligence service architecture 408 to obtain the data 112. For example, the data analytics component 102 (e.g., the monitoring component 104 of the data analytics component 102) can monitor one or more events associated with the development system 404, the operations system 406 and/or the artificial intelligence service architecture 408. Additionally or alternatively, the data analytics component 102 (e.g., the monitoring component 104 of the data analytics component 102) can monitor one or more communications (e.g., one or more API communications) associated with the development system 404, the operations system 406 and/or the artificial intelligence service architecture 408. Additionally or alternatively, the data analytics component 102 (e.g., the monitoring component 104 of the data analytics component 102) can monitor execution results generated by one or more artificial intelligence components of the artificial intelligence service architecture 408. In one example, the data analytics component 102 (e.g., the monitoring component 104 of the data analytics component 102) can monitor communication protocol error codes generated by one or more artificial intelligence components of the artificial intelligence service architecture 408. Additionally or alternatively, the data analytics component 102 (e.g., the monitoring component 104 of the data analytics component 102) can monitor input data provided to one or more artificial intelligence components of the artificial intelligence service architecture 408. In certain embodiments, the data analytics component 102 (e.g., the monitoring component 104 of the data analytics component 102) can monitor model performance associated with the one or more artificial intelligence components of the artificial intelligence service architecture 408 to detect model performance degradation and/or model accuracy. In certain embodiments, the data analytics component 102 (e.g., the machine learning component 106 of the data analytics component 102) can detect data pattern changes associated with the development system 404, the operations system 406 and/or the artificial intelligence service architecture 408. In certain embodiments, the data analytics component 102 (e.g., the machine learning component 106 of the data analytics component 102) can detect new classes of data determined by one or more artificial intelligence components of the artificial intelligence service architecture 408.

In certain embodiments, the data analytics component 102 (e.g., the development component 202 of the data analytics component 102) can provide the feedback data 114 to the development system 404, the operations system 406 and/or the artificial intelligence service architecture 408. In certain embodiments, the data analytics component 102 (e.g., the development component 202 of the data analytics component 102) can update one or more artificial intelligence components of the artificial intelligence service architecture 408 based on detected data pattern changes and/or new classes associated with the development system 404, the operations system 406 and/or the artificial intelligence service architecture 408. In certain embodiments, data analytics component 102 (e.g., the development component 202 of the data analytics component 102) can update training data for one or more artificial intelligence components of the artificial intelligence service architecture 408 based on detected data pattern changes and/or new classes associated with the development system 404, the operations system 406 and/or the artificial intelligence service architecture 408. Additionally or alternatively, data analytics component 102 (e.g., the development component 202 of the data analytics component 102) can update one or more artificial intelligence models for one or more artificial intelligence components of the artificial intelligence service architecture 408 based on detected data pattern changes and/or new classes associated with the development system 404, the operations system 406 and/or the artificial intelligence service architecture 408. In certain embodiments, a distributed version control system 410 can facilitate providing the feedback data 114 and/or updates to the development system 404, the operations system 406 and/or the artificial intelligence service architecture 408. In an aspect, the distributed version control system 410 can create a dependency graph for data associated with the development system 404, the operations system 406 and/or the artificial intelligence service architecture 408. For example, the distributed version control system 410 can create a dependency graph for data related to one or more artificial intelligence components of the artificial intelligence service architecture 408 to facilitate updating the one or more artificial intelligence components of the artificial intelligence service architecture 408. In another example, the distributed version control system 410 can provide one or more communications regarding dependencies to the development system 404, the operations system 406 and/or the artificial intelligence service architecture 408. In yet another example, the distributed version control system 410 can provide one or more update actions to the development system 404, the operations system 406 and/or the artificial intelligence service architecture 408 to facilitate updating in response to detected data pattern changes and/or new classes associated with the development system 404, the operations system 406 and/or the artificial intelligence service architecture 408.

Figure 5:
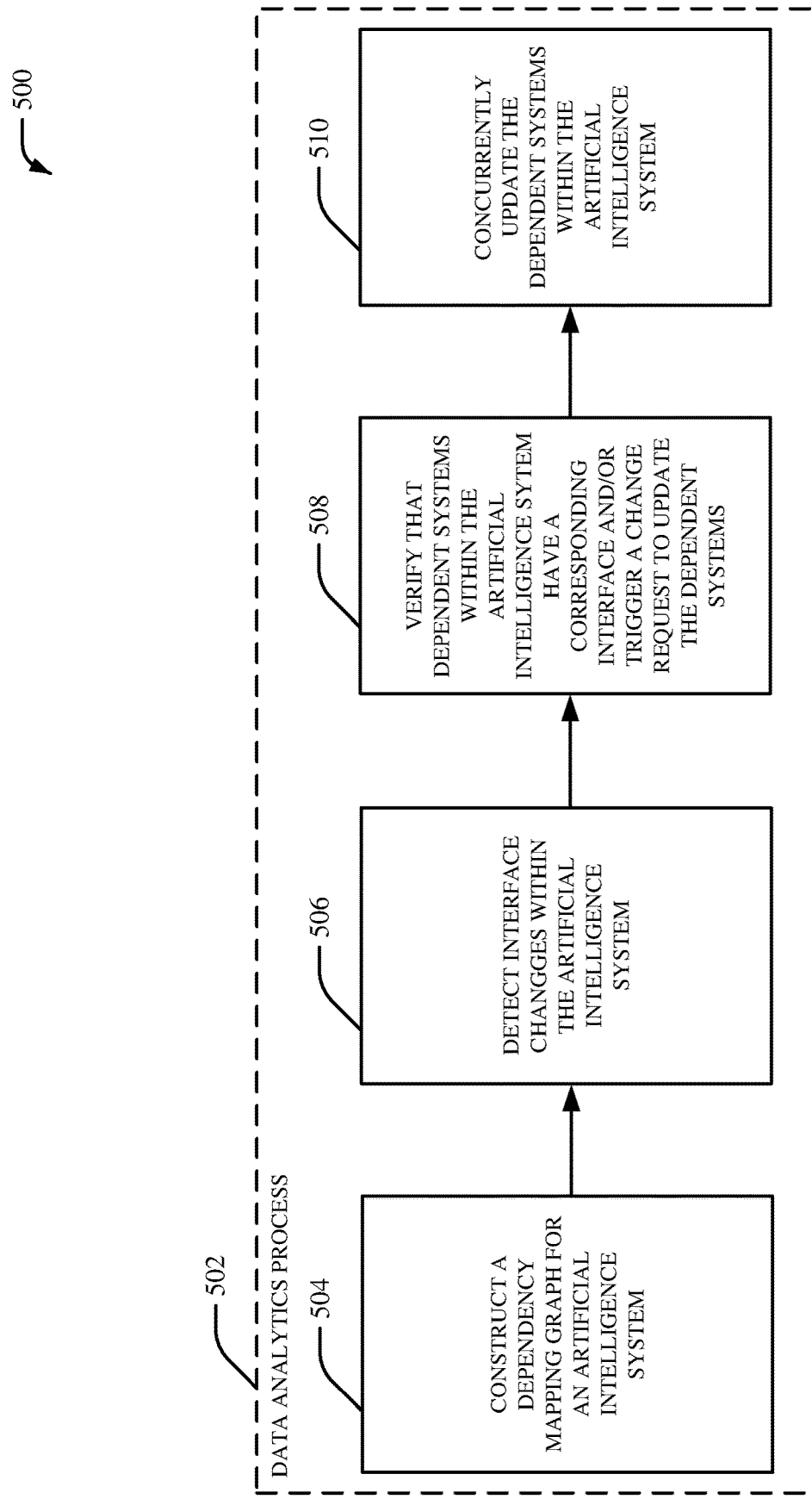
FIG. 5 illustrates an example, non-limiting system associated with a data analytics process in accordance with one or more embodiments described herein.

FIG. 5 illustrates a block diagram of an example, non-limiting system 500 in accordance with one or more embodiments described herein. Repetitive description of like elements employed in other embodiments described herein is omitted for sake of brevity.

The system 500 includes a data analytics process 502. In an embodiment, the data analytics process 502 can be a process performed by the data analytics component 102. The data analytics process 502 can include a step 504, a step 506, a step 508 and/or a step 510. The step 504 can construct a dependency mapping graph for an artificial intelligence system (e.g., the artificial intelligence system 402). The step 506 can detect interface changes within the artificial intelligence system. For example, changes with respect to communications (e.g., application programming interface communications) within the artificial intelligence system can be detected. In another example, changes with respect to data model (e.g., artificial intelligence models) within the artificial intelligence system can be detected. In yet another example, changes with respect to artificial intelligence components within the artificial intelligence system can be detected. The step 508 can verify that dependent systems within the artificial intelligence system have a corresponding interface and/or trigger a change request to update the dependent systems. For example, uniformity of data and/or updates among dependent systems within the artificial intelligence system can be verified. The dependent systems can be, for example, artificial intelligence components of the artificial intelligence system. The step 510 can concurrently update the dependent systems within the artificial intelligence system. For example, one or more artificial intelligence components within the artificial intelligence system can be updated based on an update to another artificial intelligence component within the artificial intelligence system.

Figure 6:
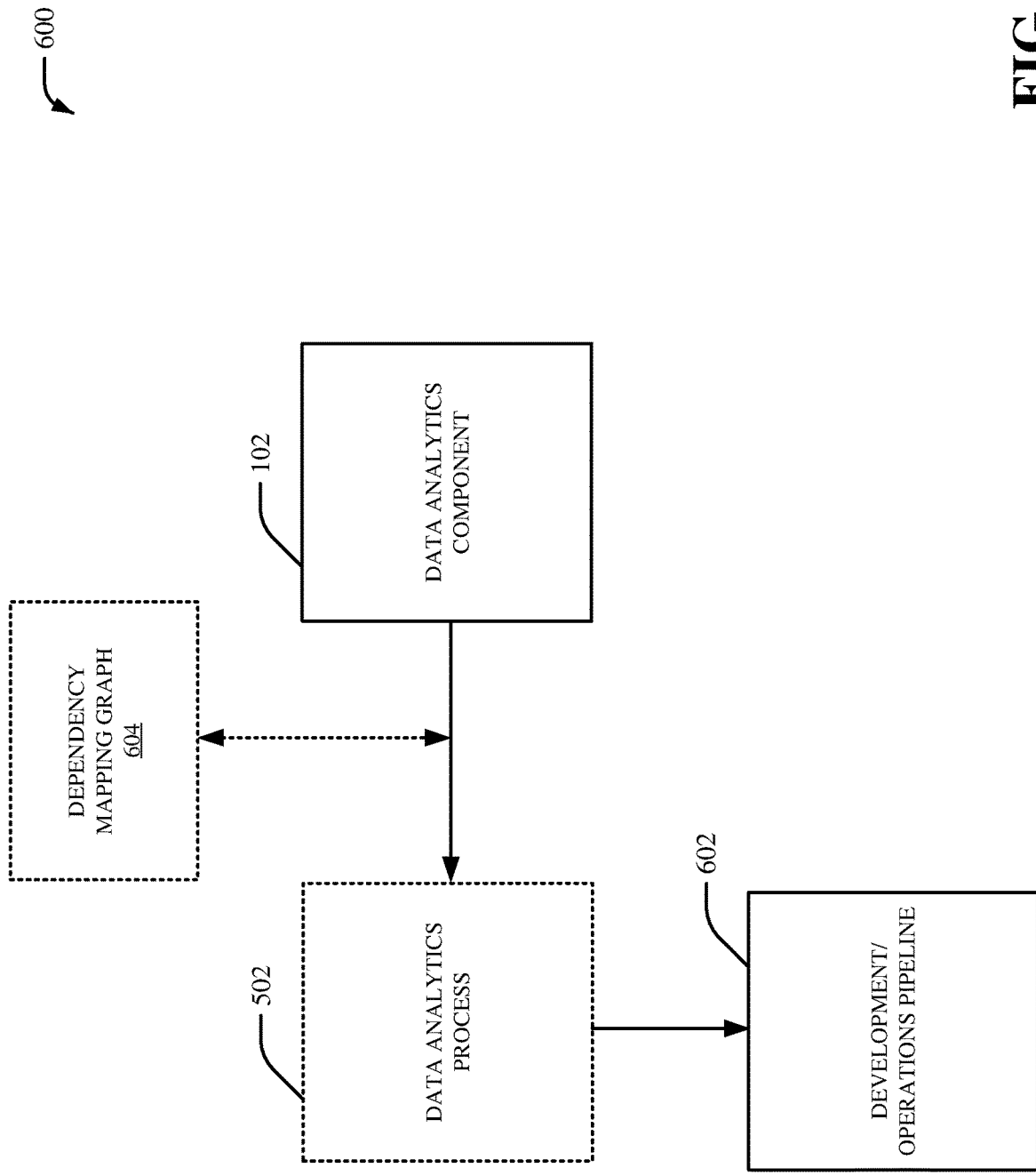
FIG. 6 illustrates another example, non-limiting system associated with feedback loop learning between artificial intelligence systems in accordance with one or more embodiments described herein.

FIG. 6 illustrates a block diagram of an example, non-limiting system 600 in accordance with one or more embodiments described herein. Repetitive description of like elements employed in other embodiments described herein is omitted for sake of brevity.

The system 600 includes the data analytics component 102. In an embodiment, the data analytics component 102 can perform the data analytics process 502 to facilitate updating a development/operations pipeline 602. For example, the development/operations pipeline 602 can include the development system 404 and/or the operations system 406 to facilitate managing development and/or operations associated with the artificial intelligence service architecture 408. In an aspect, the development/operations pipeline 602 can provide repeated integration and/or delivery of data content to the artificial intelligence service architecture 408 based on the data analytics process 502 and/or the data analytics component 102. In certain embodiments, the data analytics component 102 can generate and/or manage a dependency mapping graph 604. For example, the data analytics process 502 can construct the dependency mapping graph 604. The dependency mapping graph 604 can be, for example, a dependency mapping graph for the artificial intelligence service architecture 408. For example, the dependency mapping graph 604 can be a service mesh graph for the artificial intelligence service architecture 408. In an aspect, the dependency mapping graph 604 can be a graph that represents dependencies of two or more artificial intelligence components within the artificial intelligence service architecture 408. For example, the dependency mapping graph 604 can be a graph that represents dependencies between data for two or more artificial intelligence components within the artificial intelligence service architecture 408. In an embodiment, the dependency mapping graph 604 can provide a mapping of artificial intelligence components represented by vertices connected by edges associated with relationship among the artificial intelligence components. For instance, the dependency mapping graph 604 can provide a mapping of data elements related to artificial intelligence components represented by vertices connected by edges associated with relationship among the data elements.

Figure 7:
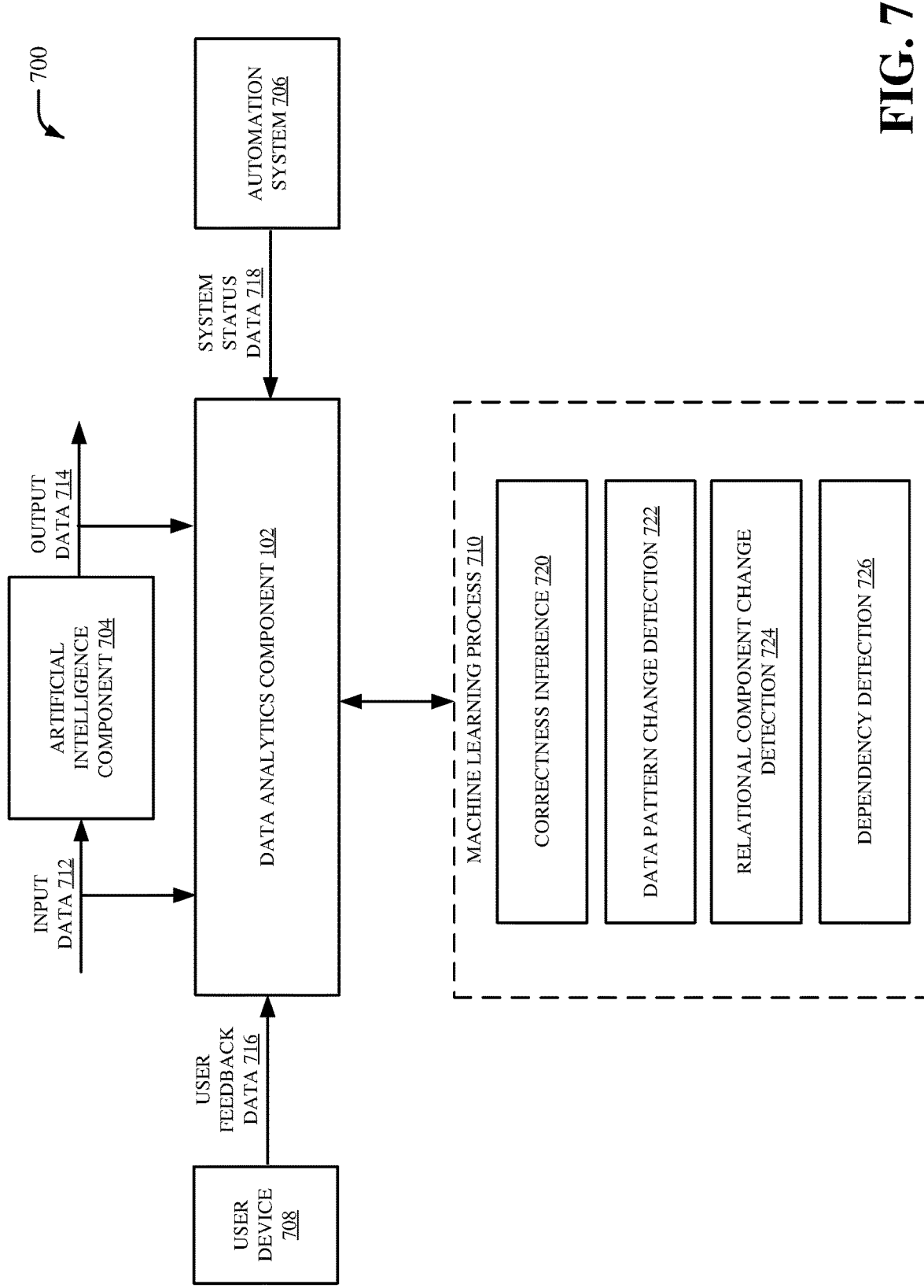
FIG. 7 illustrates yet another example, non-limiting system associated with feedback loop learning between artificial intelligence systems in accordance with one or more embodiments described herein.

FIG. 7 illustrates a block diagram of an example, non-limiting system 700 in accordance with one or more embodiments described herein. Repetitive description of like elements employed in other embodiments described herein is omitted for sake of brevity.

The system 700 includes the data analytics component 102. In an embodiment, the data analytics component 102 (e.g., the monitoring component 104 of the data analytics component 102) can monitor an artificial intelligence component 704. The artificial intelligence component 704 can be an artificial intelligence component of an artificial intelligence system (e.g., the artificial intelligence system 402). For example, the artificial intelligence component 704 can be an artificial intelligence component of an artificial intelligence service architecture (e.g., the artificial intelligence service architecture 408). In an aspect, the artificial intelligence component 704 can be an artificial intelligence system that performs decision making, recommendations, classifications and/or pattern learning. In certain embodiments, the artificial intelligence component 704 can be an artificial intelligence system that provides supervised learning to map input to output via an artificial intelligence model. For example, the artificial intelligence component 704 can maintain, generate and/or execute an artificial intelligence model based on input data 712. The artificial intelligence component 704 can additionally generate output data 714 based on the artificial intelligence model. The input data 712 can include, for example, a set of input variables and/or a set of weights. In certain embodiments, the input data 712 can include training data for an artificial intelligence model. The output data 714 can include, for example, a set of output variables, a set of predictions, and/or a set of results. In certain embodiments, the output data 714 can include learned data associated with learning, classifications, recommendations, predictions and/or inferences determined by an artificial intelligence model. In one example, the output data 714 can include a binary decision based on the input data 712. The artificial intelligence component 704 can employ any suitable machine-learning based techniques, statistical-based techniques and/or probabilistic-based techniques. For example, the artificial intelligence component 704 can employ statistical learning models, Bayesian models (e.g., Bayesian networks), Markov chain models, HMMs, expert systems, fuzzy logic, SVMs, greedy search algorithms, rule-based systems, neural networks, other non-linear training techniques, data fusion, utility-based analytical systems, systems employing Bayesian models, etc. In another aspect, the artificial intelligence component 704 can perform a set of machine learning computations associated with learning and/or classifications. For example, the artificial intelligence component 704 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations to perform learning and/or determine classifications.

In an embodiment, the data analytics component 102 (e.g., the monitoring component 104 of the data analytics component 102) can monitor the input data 712 and/or the output data 714 associated with the artificial intelligence component 704. In one example, the data analytics component 102 (e.g., the monitoring component 104 of the data analytics component 102) can monitor the input data 712 and/or the output data 714 associated with the artificial intelligence component 704 to facilitate determination regarding how a model associated with the artificial intelligence component 704 changes over time. In another embodiment, the data analytics component 102 can perform a machine learning process 710 based on monitoring of the input data 712 and/or the output data 714. Additionally or alternatively, the data analytics component 102 can perform a machine learning process 710 based on user feedback data 716 provided by a user device 708 and/or system status data 718 provided by an automation system 706. The user device 708 can be configured to interact with a user (e.g., a user identity) and/or generate the user feedback data 716. The user device 708 can be, for example, an electronic device, a display device, a desktop computer, a laptop computer, a smart device, a smart phone, a mobile device, a handheld device, a tablet device, a virtual reality device, a portable computing device, or another user device associated with a display. The user feedback data 716 can include, for example, feedback provided by a user regarding an artificial intelligence model associated with the artificial intelligence component 704. For example, the user feedback data 716 can include user feedback regarding training data and/or a classification associated with the artificial intelligence component 704. The automation system 706 can include one or more automation components of an artificial intelligence service architecture (e.g., the artificial intelligence service architecture 408). Furthermore, the automation system 706 can perform one or more automation processes associated with one or more events. The system status data 718 can include, for example, data associated with one or more communications, data associated with one or more events, and/or other data related to a status of an artificial intelligence service architecture (e.g., the artificial intelligence service architecture 408). In another embodiment, the machine learning process 710 can perform correctness inference 720, data pattern change detection 722, relational component change detection 724 and/or dependency detection 726. For example, the machine learning process 710 can perform the correctness inference 720 to determine model performance and/or model accuracy based on the input data 712, the output data 714, the user feedback data 716 and/or the system status data 718. Additionally or alternatively, the machine learning process 710 can perform the data pattern change detection 722 to determine one or more data pattern changes associated with the input data 712, the output data 714, the user feedback data 716 and/or the system status data 718. Additionally or alternatively, the machine learning process 710 can perform the relational component change detection 724 to determine one or more relational changes associated with the input data 712, the output data 714, the user feedback data 716 and/or the system status data 718. Additionally or alternatively, the machine learning process 710 can perform the dependency detection 726 to determine one or more dependencies between the input data 712, the output data 714, the user feedback data 716 and/or the system status data 718.

Figure 8:
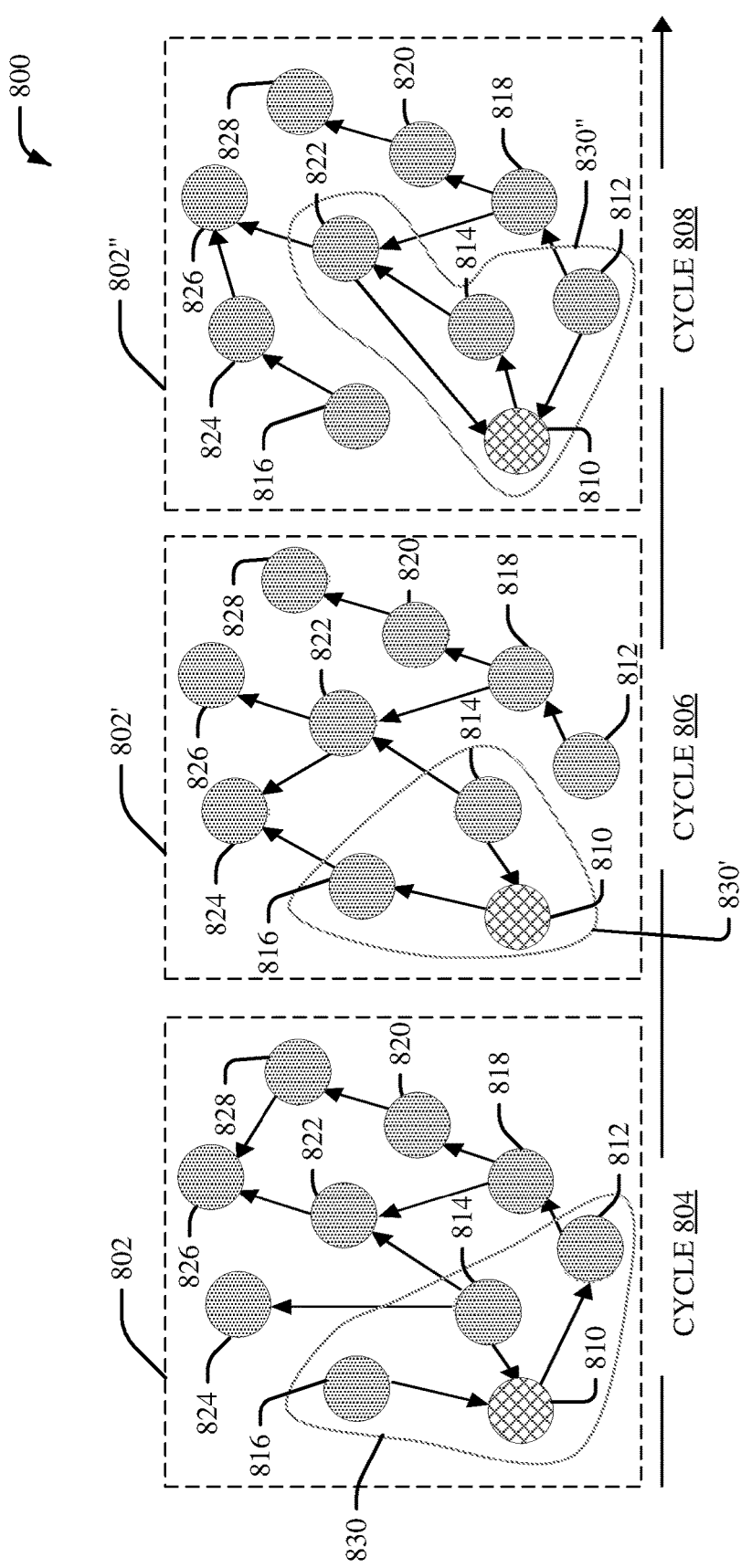
FIG. 8 illustrates an example, non-limiting system associated with a dependency mapping graph in accordance with one or more embodiments described herein.

FIG. 8 illustrates a block diagram of an example, non-limiting system 800 in accordance with one or more embodiments described herein. Repetitive description of like elements employed in other embodiments described herein is omitted for sake of brevity.

The system 800 includes a dependency mapping graph 802, a dependency mapping graph 802' and a dependency mapping graph 802". The dependency mapping graph 802' can be a modified version of the dependency mapping graph 802. Furthermore, the dependency mapping graph 802" can be a modified version of the dependency mapping graph 802'. For instance, the dependency mapping graph 802 can be associated with a cycle 804 (e.g., a first development/operations cycle) executed during a first period of time, the dependency mapping graph 802' can be associated with a cycle 806 (e.g., a second development/operations cycle) executed during a second period of time, and the dependency mapping graph 802" can be associated with a cycle 808 (e.g., a third development/operations cycle) executed during a third period of time. The dependency mapping graph 802 can be a directed acyclic graph with a set of nodes that represent artificial intelligence components. The dependency mapping graph 802 can also illustrate connections between nodes (e.g., between artificial intelligence components). In certain embodiments, the dependency mapping graph 802, the dependency mapping graph 802' and/or the dependency mapping graph 802" can provides an indication of dependencies between artificial intelligence components in an artificial intelligence system to facilitate updating artificial intelligence components and/or other portions of the artificial intelligence system. In an example, the dependency mapping graph 802 includes an artificial intelligence component 810, an artificial intelligence component 812, an artificial intelligence component 814, an artificial intelligence component 816, an artificial intelligence component 818, an artificial intelligence component 820, an artificial intelligence component 822, an artificial intelligence component 824, an artificial intelligence component 826, and an artificial intelligence component 828. Furthermore, the dependency mapping graph 802 includes a service component 830. The service component 830 can be a set of artificial intelligence components that require an update. For example, the service component 830 can include the artificial intelligence component 810, the artificial intelligence component 812, the artificial intelligence component 814, and the artificial intelligence component 816. In an example, training data for the artificial intelligence component 810, the artificial intelligence component 812, the artificial intelligence component 814, and the artificial intelligence component 816 can be concurrently updated. In another example, a model (e.g., an artificial intelligence model) for the artificial intelligence component 810, the artificial intelligence component 812, the artificial intelligence component 814, and the artificial intelligence component 816 can be concurrently updated. In an aspect, the artificial intelligence component 810, the artificial intelligence component 812, the artificial intelligence component 814, and/or the artificial intelligence component 816 can be in communication and/or can include related processing. The dependency mapping graph 802' includes a service component 830'. The service component 830' can be a different set of artificial intelligence components that require an update. For example, the service component 830' can include the artificial intelligence component 810, the artificial intelligence component 814, and the artificial intelligence component 816. In an example, training data for the artificial intelligence component 810, the artificial intelligence component 814, and the artificial intelligence component 816 can be concurrently updated. In another example, a model (e.g., an artificial intelligence model) for the artificial intelligence component 810, the artificial intelligence component 814, and the artificial intelligence component 816 can be concurrently updated. In an aspect, the artificial intelligence component 810, the artificial intelligence component 814, and/or the artificial intelligence component 816 can be in communication and/or can include related processing. The dependency mapping graph 802" includes a service component 830". The service component 830" can be a different set of artificial intelligence components that require an update. For example, the service component 830' can include the artificial intelligence component 810, the artificial intelligence component 812, the artificial intelligence component 814, and the artificial intelligence component 822. In an example, training data for the artificial intelligence component 810, the artificial intelligence component 812, the artificial intelligence component 814, and the artificial intelligence component 822 can be concurrently updated. In another example, a model (e.g., an artificial intelligence model) for the artificial intelligence component 810, the artificial intelligence component 812, the artificial intelligence component 814, and the artificial intelligence component 822 can be concurrently updated. In an aspect, the artificial intelligence component 810, the artificial intelligence component 812, the artificial intelligence component 814, and/or the artificial intelligence component 822 can be in communication and/or can include related processing.

Figure 9:
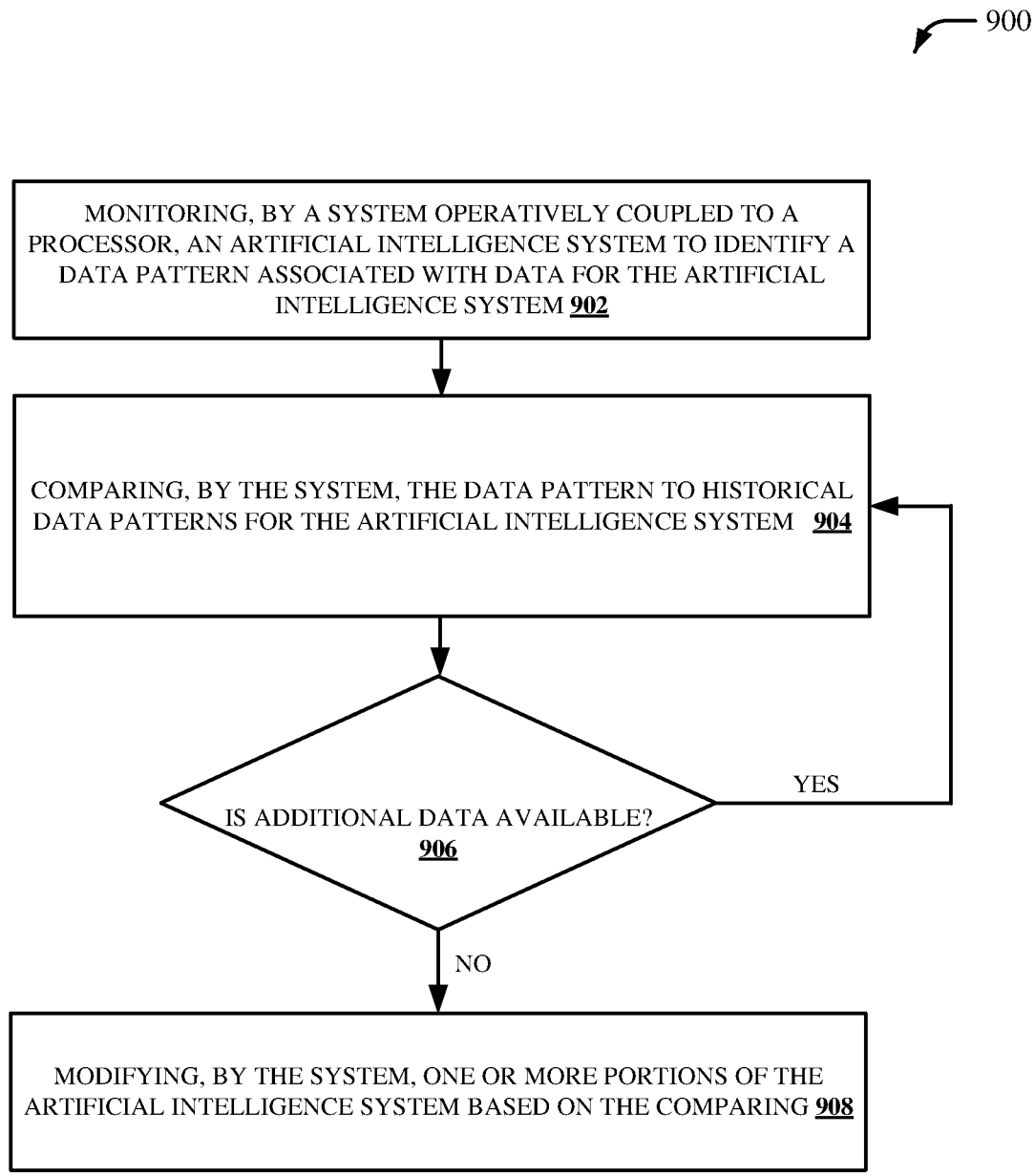
FIG. 9 illustrates a flow diagram of an example, non-limiting computer-implemented method for facilitating feedback loop learning between artificial intelligence systems in accordance with one or more embodiments described herein.

FIG. 9 illustrates a flow diagram of an example, non-limiting computer-implemented method 900 that facilitates feedback loop learning between artificial intelligence systems in accordance with one or more embodiments described herein. At 902, an artificial intelligence system is monitored, by a system operatively coupled to a processor (e.g., by monitoring component 104), to identify a data pattern associated with data for the artificial intelligence system. In an embodiment, one or more communication channels associated with the artificial intelligence system can be monitored. For example, one or more API communications associated with the artificial intelligence system can be monitored. In another example, input data provided to one or more artificial intelligence components of the artificial intelligence system can be monitored. Additionally or alternatively, output data provided by one or more artificial intelligence components of the artificial intelligence system can be monitored. In certain embodiments, one or more events associated with the artificial intelligence system can be monitored. For example, one or more events associated with one or more artificial intelligence components of the artificial intelligence system can be monitored. In another example, one or more events associated with different artificial intelligence subsystems of the artificial intelligence system can be monitored. In yet another example, one or more events associated with an operations system associated with the artificial intelligence system and/or a development system associated with the artificial intelligence system can be monitored. In certain embodiments, accuracy of output data generated by one or more components of the artificial intelligence system can be monitored. For example, accuracy of output data generated by one or more artificial intelligence components of the artificial intelligence system can be monitored. In an aspect, one or more portions of the data can be compared to a set of previously defined data patterns. A data pattern can be, for example, a digital data pattern associated with a classification. For example, a data pattern can be a defined arrangement of one or more characteristics of data. In certain embodiments, a data pattern associated with the data can be identified based on a dependency mapping graph for the artificial intelligence system. The dependency mapping graph can be, for example, a graph that represents dependencies of two or more components (e.g., two or more artificial intelligence components). For example, the dependency mapping graph can provide a mapping of components (e.g., artificial intelligence components) represented by vertices connected by edges associated with relationship among the components (e.g., artificial intelligence components). Additionally or alternatively, the dependency mapping graph can be, for example, a graph that represents dependencies of two or more data elements. For example, the dependency mapping graph can provide a mapping of data elements represented by vertices connected by edges associated with relationship among the data elements.

At 904, the data pattern is compared, by the system (e.g., by machine learning component 106), to historical data patterns for the artificial intelligence system. For example, the data pattern can be compared to the historical data patterns using one or more machine learning techniques. In an embodiment, a classification for the data pattern can be determined based on the historical data patterns for the artificial intelligence system. In certain embodiments, one or more patterns, one or more inferences, one or more correlations, one or more features and/or information related to the data and/or the data pattern can be learned using one or more machine learning techniques. In an aspect, one or more patterns, one or more inferences, one or more correlations, one or more features and/or information related to the and/or the data pattern can be learned based on classifications, correlations, inferences and/or expressions associated with principles of artificial intelligence. For instance, in certain embodiments, an automatic classification system and/or an automatic classification process can be employed to learn one or more patterns, one or more inferences, one or more correlations, one or more features and/or information related to the data and/or the data pattern.

At 906, it is determined whether additional data is available. If yes, the computer-implemented method 900 returns to 904. If no, the computer-implemented method 900 proceeds to 908.

At 908, one or more portions of the artificial intelligence system is modified, by the system (e.g., by development component 202), based on the comparing. In an example, one or more portions of one or more models (e.g., one or more artificial intelligence models) associated with the artificial intelligence system can be modified. In another example, one or more portions of source code associated with the artificial intelligence system can be updated. Additionally or alternatively, one or more portions of one or more artificial intelligence components in the artificial intelligence system can be modified. Additionally or alternatively, training data provided to one or more artificial intelligence components in the artificial intelligence system can be modified. In certain embodiments, one or more artificial intelligence components in the artificial intelligence system can be modified in response to another artificial intelligence component in the artificial intelligence system being modified. In certain embodiments, the one or more portions of the artificial intelligence system can be modified based on a dependency mapping graph that provides an indication of dependencies between artificial intelligence components in the artificial intelligence system. In certain embodiments, the comparing and/or the modifying can include improving performance of the artificial intelligence system.

Figure 10:
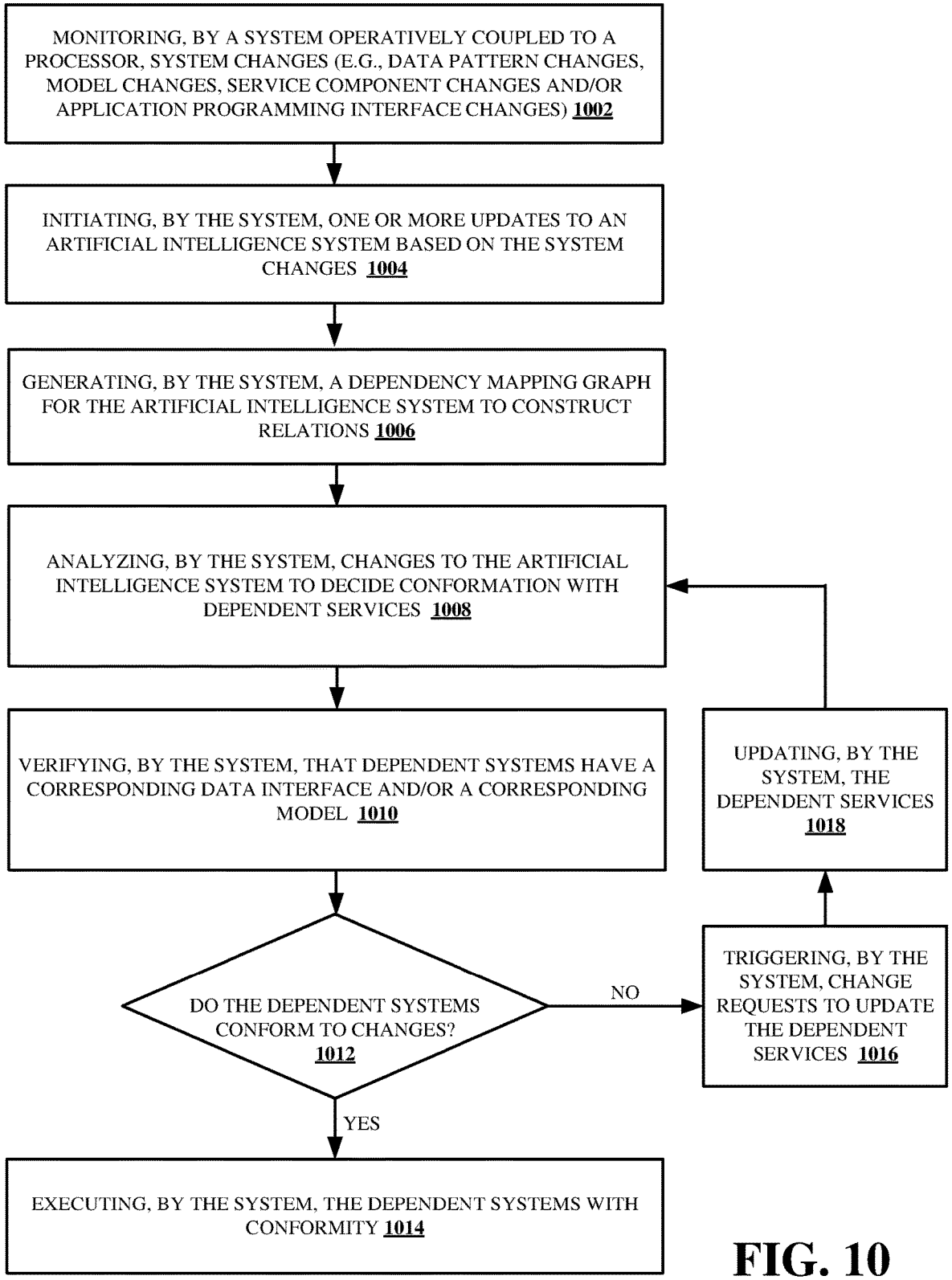
FIG. 10 illustrates a flow diagram of another example, non-limiting computer-implemented method for facilitating feedback loop learning between artificial intelligence systems in accordance with one or more embodiments described herein.

FIG. 10 illustrates a flow diagram of an example, non-limiting computer-implemented method 1000 that facilitates feedback loop learning between artificial intelligence systems in accordance with one or more embodiments described herein. At 1002, system changes (e.g., data pattern changes, model changes, service component changes and/or application programming interface changes) are monitored by a system operatively coupled to a processor (e.g., by monitoring component 104). At 1004, one or more updates to an artificial intelligence system are initiated by the system (e.g., by monitoring component 104) based on the system changes. At 1006, a dependency mapping graph for the artificial intelligence system is generated, by the system (e.g., by machine learning component 106), to construct relations. At 1008, changes to the artificial intelligence system are analyzed, by the system (e.g., by machine learning component 106), to decide conformation with dependent services. At 1010, it is verified, by the system (e.g., by development component 202) that dependent systems have a corresponding data interface and/or a corresponding model. At 1012, it is determined whether the dependent systems conform to changes. If yes, the computer-implemented method 1000 proceeds to 1014. If no, the computer-implemented method 1000 proceeds to 1016. At 1014, the dependent systems are executed, by the system (e.g., by development component 202), with conformity. After 1014, the computer-implemented method 1000 can end. At 1016, change requests are triggered, by the system (e.g., by development component 202), to update the dependent services. At 1018, the dependent services are updated by the system (e.g., by development component 202). After 1018, the computer-implemented method 1000 can return to 1008.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Moreover, because at least monitoring an artificial intelligence system, modifying an artificial intelligence system, etc. are established from a combination of electrical and mechanical components and circuitry, a human is unable to replicate or perform processing performed, for example, by the data analytics component 102 (e.g., the monitoring component 104. the machine learning component 106 and/or the development component 202) disclosed herein. For example, a human is unable to apply an monitor an artificial intelligence system, modify an artificial intelligence system, etc.

Figure 11:
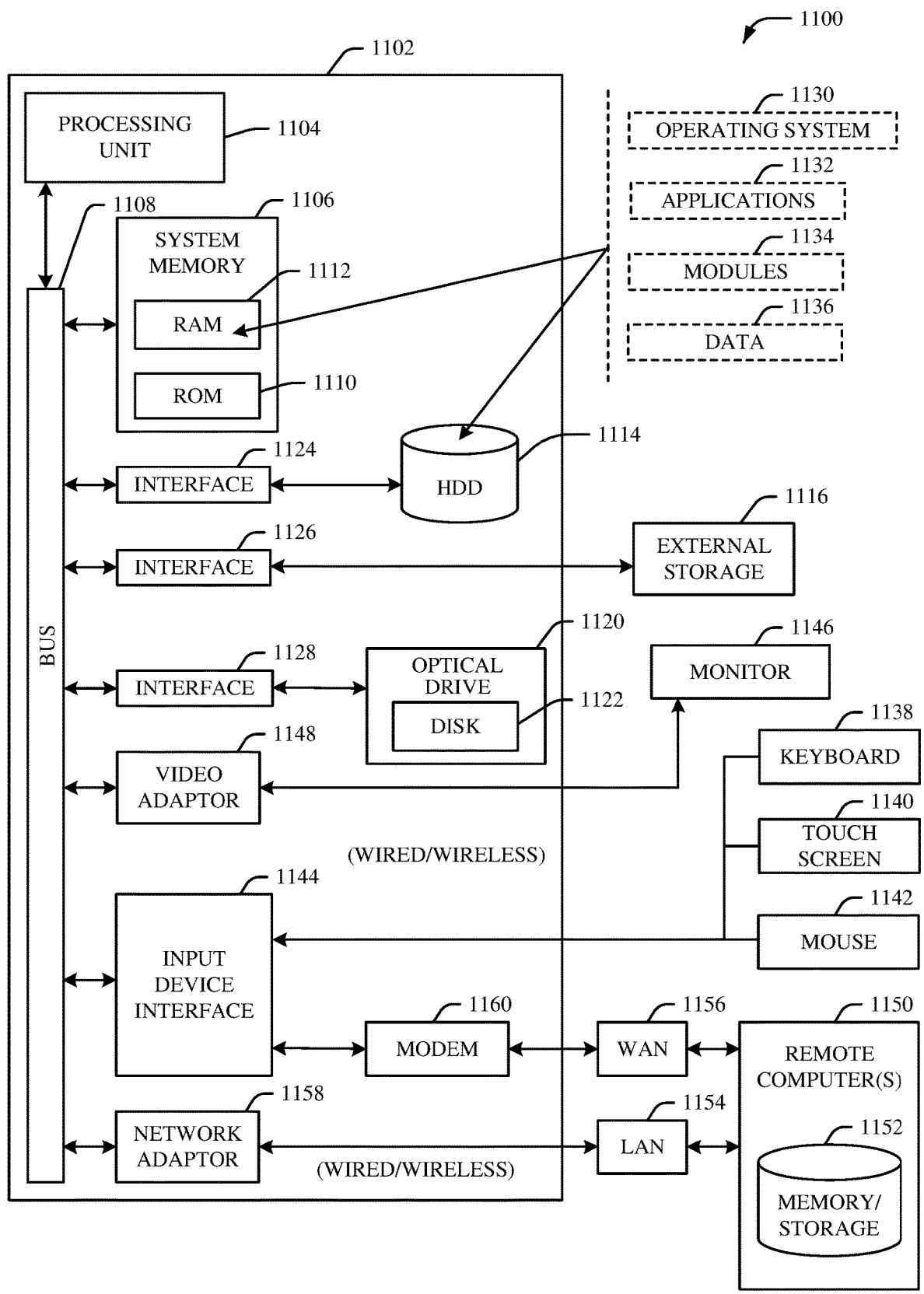
FIG. 11 illustrates a block diagram of an example, non-limiting operating environment in which one or more embodiments described herein can be facilitated.

In order to provide additional context for various embodiments described herein, FIG. 11 and the following discussion are intended to provide a general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enable with a security module, such as a trusted processing module (TPM). For instance with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 12:
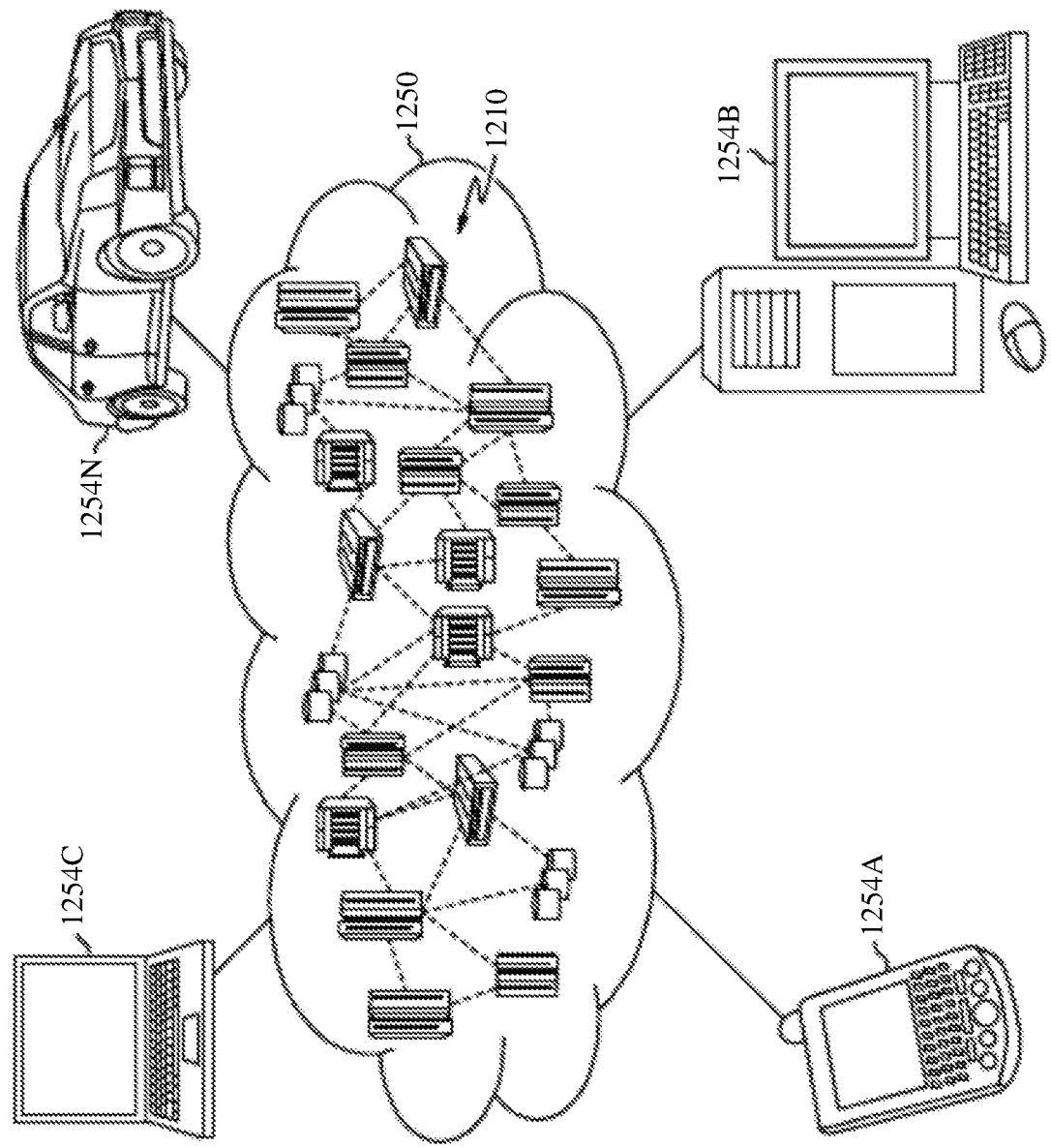
FIG. 12 illustrates a block diagram of an example, non-limiting cloud computing environment in accordance with one or more embodiments of the present invention.

Referring now to FIG. 12, an illustrative cloud computing environment 1250 is depicted. As shown, cloud computing environment 1250 includes one or more cloud computing nodes 1210 with which local computing devices used by cloud consumers, such as, for example, personal digital assistant (PDA) or cellular telephone 1254A, desktop computer 1254B, laptop computer 1254C, and/or automobile computer system 1254N may communicate. Nodes 1210 may communicate with one another. They may be grouped (not shown) physically or virtually, in one or more networks, such as Private, Community, Public, or Hybrid clouds as described hereinabove, or a combination thereof. This allows cloud computing environment 1250 to offer infrastructure, platforms and/or software as services for which a cloud consumer does not need to maintain resources on a local computing device. It is understood that the types of computing devices 1254A-N shown in FIG. 12 are intended to be illustrative only and that computing nodes 1210 and cloud computing environment 1250 can communicate with any type of computerized device over any type of network and/or network addressable connection (e.g., using a web browser).

Figure 13:
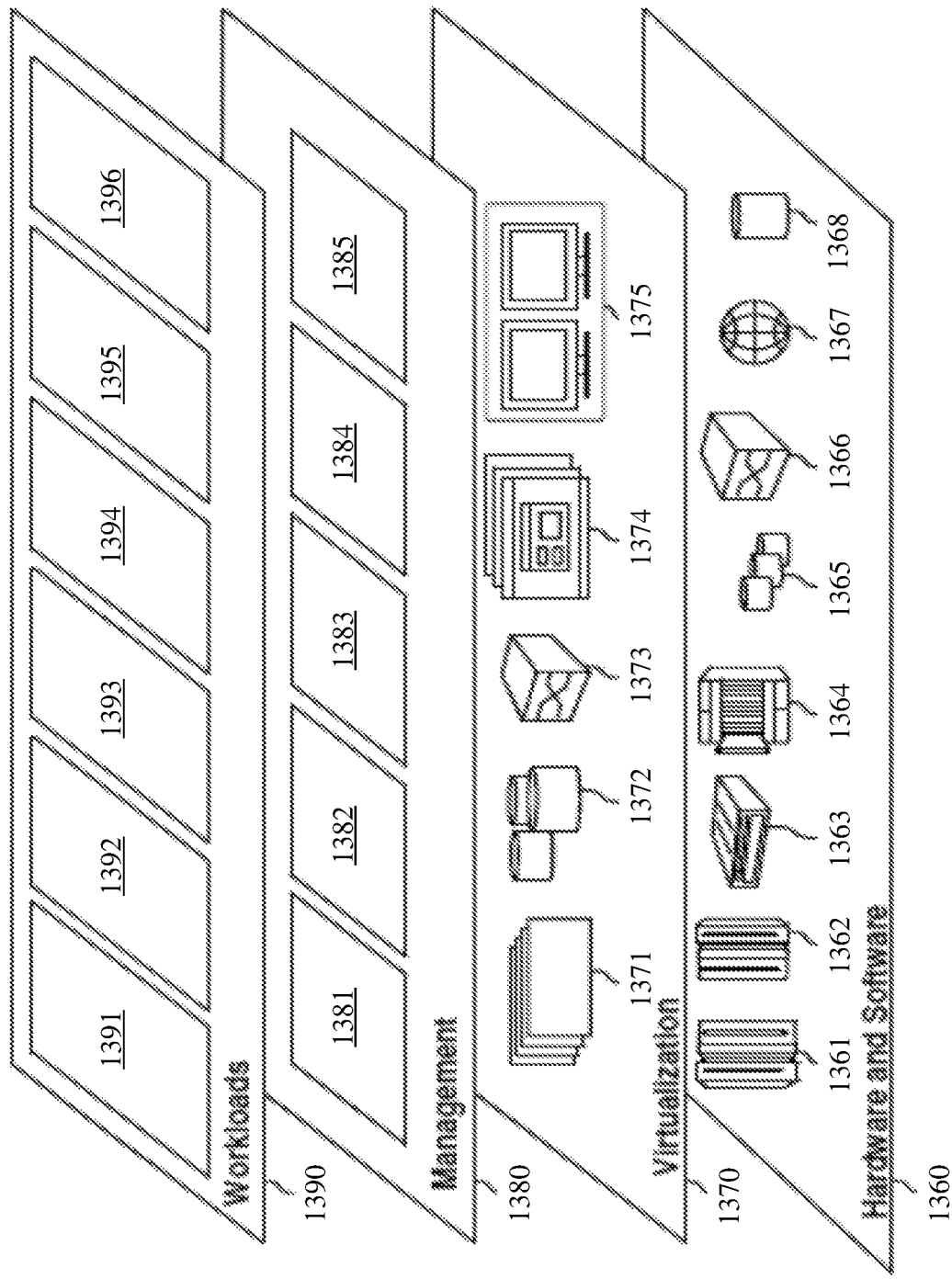
FIG. 13 illustrates a block diagram of example, non-limiting abstraction model layers in accordance with one or more embodiments of the present invention.

Referring now to FIG. 13, a set of functional abstraction layers provided by cloud computing environment 1250 (FIG. 12) is shown. It should be understood in advance that the components, layers, and functions shown in FIG. 13 are intended to be illustrative only and embodiments of the invention are not limited thereto. As depicted, the following layers and corresponding functions are provided:

Hardware and software layer 1360 includes hardware and software components. Examples of hardware components include: mainframes 1361; RISC (Reduced Instruction Set Computer) architecture based servers 1362; servers 1363; blade servers 1364; storage devices 1365; and networks and networking components 1366. In some embodiments, software components include network application server software 1367 and database software 1368.

Virtualization layer 1370 provides an abstraction layer from which the following examples of virtual entities may be provided: virtual servers 1371; virtual storage 1372; virtual networks 1373, including virtual private networks; virtual applications and operating systems 1374; and virtual clients 1375.

In one example, management layer 1380 may provide the functions described below. Resource provisioning 1381 provides dynamic procurement of computing resources and other resources that are utilized to perform tasks within the cloud computing environment. Metering and Pricing 1382 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1383 provides access to the cloud computing environment for consumers and system administrators. Service level management 1384 provides cloud computing resource allocation and management such that required service levels are met. Service Level Agreement (SLA) planning and fulfillment 1385 provide pre-arrangement for, and procurement of, cloud computing resources for which a future requirement is anticipated in accordance with an SLA.

Workloads layer 1390 provides examples of functionality for which the cloud computing environment may be utilized. Non-limiting examples of workloads and functions which may be provided from this layer include: mapping and navigation 1391; software development and lifecycle management 1392; virtual classroom education delivery 1393; data analytics processing 1394; transaction processing 1395; and data analytics software 1396.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
    a memory that stores computer executable components; and
    a processor that executes the computer executable components stored in the memory, wherein the computer executable components comprise:
        a data analytics component that, based on an analysis of a microservices mesh, constructs a dependency mapping graph for artificial intelligence components of the microservices mesh, wherein the nodes of dependency mapping graph represent the artificial intelligence components, and edges of the dependency mapping graph represent respective dependencies between the artificial intelligence components;
        a monitoring component that identifies, in real time, a data pattern associated with data generated during execution of the artificial intelligence components of the microservices mesh in a runtime environment of an artificial intelligence system;
        a machine learning component that employs machine learning to:
            determine, in real time, a deviation of the data pattern from one or more historical data patterns associated with one or more prior executions of the artificial intelligence components in the runtime environment of the artificial intelligence system, wherein the deviation indicates a need for a modification of at least one corresponding artificial intelligence component, in a development environment of the artificial intelligence system, that corresponds to at least one artificial intelligence component of the artificial intelligence components, and wherein the deviation comprises a new class of data representative of a new use case for the artificial intelligence components, and
            determine, based on the dependency mapping graph, a need for another modification of at least one other artificial intelligence component that depends on the at least one corresponding artificial intelligence component based on the modification of at least one corresponding artificial intelligence component; and
        a development component that implements the modification of the at least one corresponding artificial intelligence component and the other modification of the at least one other artificial intelligence component in the development environment of the artificial intelligence system.

2. The system of claim 1, wherein the monitoring component identifies the data pattern associated with the data based on the dependency mapping graph for the artificial intelligence components.

3. The system of claim 1, wherein the monitoring component monitors one or more application programming interface communications in the data associated with the artificial intelligence components.

4. The system of claim 1, wherein the monitoring component monitors one or more events in the data associated with the artificial intelligence components.

5. The system of claim 1, wherein the monitoring component monitors accuracy of output data in the data generated by the at least one artificial intelligence component of the artificial intelligence components.

6. The system of claim 1, wherein the machine learning component infers a new classification for the at least one corresponding artificial intelligence component.

7. The system of claim 1, wherein the development component that trains the at least one corresponding artificial intelligence component based on the data pattern.

8. The system of claim 1, wherein the development component updates respective artificial intelligence models of the at least one corresponding artificial intelligence component based on the data pattern.

9. The system of claim 1, wherein the machine learning component compares the data pattern to the one or more historical data patterns to improve performance of the artificial intelligence system.

10. A computer-implemented method, comprising:
    based on an analysis of a microservices mesh, constructing, by a system operatively coupled to a processor, a dependency mapping graph for artificial intelligence components of the microservices mesh, wherein the nodes of dependency mapping graph represent the artificial intelligence components, and edges of the dependency mapping graph represent respective dependencies between the artificial intelligence components;
    identifying, by the system, in real time, a data pattern associated with data generated during execution of artificial intelligence components of the microservices mesh in a runtime environment of a the artificial intelligence system; and
    determining, by the system, using machine learning, in real time, a deviation of the data pattern from one or more historical data patterns associated with one or more prior executions of the artificial intelligence components in the runtime environment of the artificial intelligence system, wherein the deviation indicates a need for a modification of at least one corresponding artificial intelligence component, in a development environment of the artificial intelligence system, that corresponds to at least one artificial intelligence component of the artificial intelligence components, and wherein the deviation comprises a new class of data representative of a new use case for the artificial intelligence components;

determining, by the system, based on the dependency mapping graph, a need for another modification of at least one other artificial intelligence component that depends on the at least one corresponding artificial intelligence component based on the modification of at least one corresponding artificial intelligence component; and implementing, by the system, the modification of the at least one corresponding artificial intelligence component and the other modification of the at least one other artificial intelligence component in the development environment of the artificial intelligence system.

11. The computer-implemented method of claim 10, further comprising:

inferring, by the system, a new classification for the at least one corresponding artificial intelligence component based on the comparing.

12. The computer-implemented method of claim 10, wherein the modification comprises:

modifying, by the system, one or more weights of the at least one corresponding artificial intelligence component.

13. The computer-implemented method of claim 10, wherein the modification comprises:

modifying, by the system, one or more respective models associated with the at least one corresponding artificial intelligence component.

14. The computer-implemented method of claim 10, wherein the modification comprises:

modifying, by the system, respective training data associated with the at least one corresponding artificial intelligence component.

15. The computer-implemented method of claim 10, wherein the identifying the data pattern is based on the dependency mapping graph for the artificial intelligence components.

16. A computer program product facilitating feedback loop learning for an artificial intelligence system, the computer program product comprising a computer readable storage medium having program instructions embodied therewith, the program instructions executable by a processor to cause the processor to:

based on an analysis of a microservices mesh, constructing, by the processor, a dependency mapping graph for artificial intelligence components of the microservices mesh, wherein the nodes of dependency mapping graph represent the artificial intelligence components, and edges of the dependency mapping graph represent respective dependencies between the artificial intelligence components;

identify, by the processor, in real time, a data pattern associated with data generated during execution of artificial intelligence components of the microservices mesh in a runtime environment of the artificial intelligence system;

determine, by the processor, using machine learning, in real time, a deviation of the data pattern from one or more historical data patterns associated with one or more prior executions of the artificial intelligence components in the runtime environment of the artificial intelligence system, wherein the deviation indicates a need for a modification of at least one corresponding artificial intelligence component, in a development environment of the artificial intelligence system, that corresponds to at least one artificial intelligence component of the artificial intelligence components, and wherein the deviation comprises a new class of data representative of a new use case for the artificial intelligence components;

determining, by the processor, based on the dependency mapping graph, a need for another modification of at least one other artificial intelligence component that depends on the at least one corresponding artificial intelligence component based on the modification of at least one corresponding artificial intelligence component; and implement, by the processor, the modification of the at least one corresponding artificial intelligence component and the other modification of the at least one other artificial intelligence component in the development environment of the artificial intelligence system.

17. The computer program product of claim 16, wherein the modification comprises:

modify, by the processor, one or more weights of the at least one corresponding artificial intelligence component.

18. The computer program product of claim 16, wherein the modification comprises:

modify, by the processor, one or more respective artificial intelligence models of the at least one corresponding artificial intelligence component.

19. The computer program product of claim 16, wherein the modifying comprises:

modification, by the processor, respective training data for the at least one corresponding artificial intelligence component.

20. The computer program product of claim 16, wherein the identifying the data pattern is based on the dependency mapping graph for the artificial intelligence components.

* * * * *